United States Patent
Takeda et al.

(10) Patent No.: US 12,557,114 B2
(45) Date of Patent: Feb. 17, 2026

(54) TECHNIQUES FOR PROCESSING DOWNLINK CONTROL INFORMATION FOR SCHEDULING MULTIPLE CELLS

(71) Applicant: QUALCOMM Incorporated, San Diego, CA (US)

(72) Inventors: Kazuki Takeda, Minato-ku (JP); Jae Ho Ryu, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 18/170,162

(22) Filed: Feb. 16, 2023

(65) Prior Publication Data

US 2024/0284466 A1    Aug. 22, 2024

(51) Int. Cl.
*H04W 72/23*        (2023.01)
*H04W 72/1263*     (2023.01)

(52) U.S. Cl.
CPC ....... *H04W 72/23* (2023.01); *H04W 72/1263* (2013.01)

(58) Field of Classification Search
CPC ..... H04L 5/0053; H04L 5/001; H04L 5/0094; H04W 72/1263; H04W 72/23
See application file for complete search history.

(56) References Cited

U.S. PATENT DOCUMENTS

| | | | |
|---|---|---|---|
| 2022/0210800 A1 | 6/2022 | Babaei | |
| 2022/0232656 A1* | 7/2022 | Takahashi | H04W 8/24 |
| 2022/0311501 A1* | 9/2022 | Koskela | H04W 76/19 |
| 2022/0330156 A1* | 10/2022 | Zhou | H04W 52/0206 |
| 2023/0144002 A1* | 5/2023 | Kim | H04L 5/001 |
| | | | 370/329 |

(Continued)

FOREIGN PATENT DOCUMENTS

| | | |
|---|---|---|
| EP | 3917058 A1 | 12/2021 |
| WO | WO-2021206422 A1 | 10/2021 |
| WO | WO-2023211358 A1 | 11/2023 |

OTHER PUBLICATIONS

International Search Report and Written Opinion—PCT/US2024/014851—ISA/EPO—Jun. 11, 2024.

*Primary Examiner* — Andrew Lee
(74) *Attorney, Agent, or Firm* — QUALCOMM Incorporated

(57) ABSTRACT

Methods, systems, and devices for wireless communications are described for processing downlink control information (DCI) for scheduling multiple cells. A user equipment (UE) may receive indications of a resource set (e.g., one or more search spaces) for downlink control signaling. The resource set may include a first set of candidates for DCI that supports multi-cell scheduling (e.g., cross-cell scheduling) for a set of cells, and multiple second sets of candidates for DCI that supports single-cell scheduling of a respective cell (e.g., self-scheduling, cross-carrier scheduling). The UE may monitor the resource set for DCI that schedules communications (e.g., uplink communications, downlink communications, or both) via the set of cells based on the indications of the resource set. The UE may receive one or more instances of DCI, and communicate via at least one of the cells of the set based on the received one or more instances of DCI.

30 Claims, 20 Drawing Sheets

(56) References Cited

U.S. PATENT DOCUMENTS

| | | | |
|---|---|---|---|
| 2023/0328753 A1* | 10/2023 | Kim | H04L 5/0053 |
| | | | 370/329 |
| 2023/0354367 A1* | 11/2023 | Wang | H04W 72/232 |
| 2024/0023134 A1* | 1/2024 | Kim | H03M 13/3715 |
| 2024/0039587 A1* | 2/2024 | Liu | H04B 7/0456 |
| 2024/0057119 A1* | 2/2024 | Sun | H04L 5/0053 |
| 2024/0267931 A1* | 8/2024 | Zhou | H04W 72/12 |
| 2025/0039874 A1* | 1/2025 | Matsumura | H04W 88/02 |

* cited by examiner

TECHNIQUES FOR PROCESSING DOWNLINK CONTROL INFORMATION FOR SCHEDULING MULTIPLE CELLS

FIELD OF TECHNOLOGY

The following relates to wireless communications, including techniques for processing downlink control information (DCI) for scheduling multiple cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for processing downlink control information (DCI) for scheduling multiple cells. For example, in some implementations, a user equipment (UE) may be configured to support communications (e.g., uplink communications, downlink communications, or both) with a network via a set of multiple cells, which may be scheduled by a network entity using one or more instances of DCI. Communications via the set of cells may be scheduled via single-cell scheduling techniques or multi-cell scheduling techniques. For single-cell scheduling, a cell of the set may be used to convey DCI that schedules communications via the same cell (e.g., for self-scheduling of communications via a same carrier that carries the DCI, for cross-carrier scheduling of communications via a set of carriers that may be different than a carrier that carries the DCI). For multi-cell scheduling (e.g., cross-cell scheduling), a cell may be used convey one or more instances of DCI that schedules communications via any one or more cells of the set.

In some implementations, DCI formats may be defined for different types of scheduling and for different types of communication. For example, DCI formats for single-cell scheduling may include one or more formats for scheduling uplink communications (e.g., DCI formats 0_0, 0_1, and 0_2) and one or more formats for scheduling downlink communications (e.g., DCI formats 1_0, 1_1, 1_2). DCI formats for multi-cell scheduling also may include one or more formats for scheduling uplink communications (e.g., DCI format 0_X) and one or more formats for scheduling downlink communications (e.g., DCI format 1_X).

In some examples, DCI may be received by a UE via a configured set of communications resources that are allocated for blind decoding of control signaling candidates (e.g., blind decode (BD) candidates, physical downlink control channel (PDCCH) candidates, control channel element (CCE) candidates), which may be configured in accordance with one or more search spaces. A UE may attempt to blindly decode such candidates to attempt to identify instances of DCI that are directed to the UE, such as instances of scheduling DCI (e.g., instances of DCI that schedule uplink communications for the UE, instances of DCI that schedule downlink communications for the UE). However, specific combinations of DCI formats that are to be supported by the UE in a given monitoring duration, including combinations of formats of single-cell scheduling DCI and formats of multi-cell scheduling DCI, may not be explicitly configured.

In accordance with examples as disclosed herein, a network entity and a UE may be configured to support at least some combinations of DCI formats and, in some examples, exclude some other combinations of DCI formats, in a given monitoring duration. For example, a configured set of cells may be associated with a scheduling cell, and repeating occasions of a monitoring duration associated with the scheduling cell (e.g., a monitoring interval, a slot of the scheduling cell). During a monitoring duration, the network entity may transmit instances of DCI (e.g., instances of certain DCI formats) via one or more cells of a set that satisfy criteria for combinations of single-cell scheduling DCI and multi-cell scheduling DCI, such that the UE may blindly decode candidates of one or more search spaces in accordance with the criteria for the combinations. In some examples, during a given monitoring duration, the UE may be expected to process single-cell scheduling DCI, or multi-cell scheduling DCI, but not both. In some other examples, during a given monitoring duration, the UE may be expected to process single-cell scheduling DCI that schedules a given cell, or multi-cell scheduling DCI that schedules a given cell, but not both single-cell scheduling DCI and multi-cell scheduling DCI that schedules a given cell. In some implementations, the UE may indicate a capability to support various combinations of DCI, which may be associated with a hardware capability or a performance mode or capability of the UE, or may be an indication of one or more configurations for combinations that are enabled at the UE. In accordance with these and other examples for criteria for combining single-cell scheduling DCI and multi-cell scheduling DCI in a given monitoring duration, a communications system may be configured in a manner that simplifies blind decoding of one or more search spaces, which may support reduced power consumption, reduced processor utilization, or reduced latency at a UE, among other advantages.

A method for wireless communication at a UE is described. The method may include receiving one or more indications of a resource set for downlink control signaling, the resource set including a first set of candidates for first DCI that supports scheduling communications with any one or more of a set of multiple cells and a set of multiple second sets of candidates, one or more second sets of candidates for second DCI that supports scheduling communications with a respective single cell of the set of multiple cells, and monitoring the resource set for DCI that schedules communications via one or more cells of the set of multiple cells based on the one or more indications.

An apparatus for wireless communication at a UE is described. The apparatus may include a processor, memory coupled with the processor, and instructions stored in the memory. The instructions may be executable by the processor to cause the apparatus to receive one or more indications of a resource set for downlink control signaling, the resource set including a first set of candidates for first DCI that support scheduling communications with any one or more of a set of multiple cells and a set of multiple second sets of candidates, one or more second sets of candidates for second DCI that support scheduling communications with a respective single cell of the set of multiple cells, and monitor the resource set for DCI that schedules communications via one or more cells of the set of multiple cells based on the one or more indications.

Another apparatus for wireless communication at a UE is described. The apparatus may include means for receiving one or more indications of a resource set for downlink control signaling, the resource set including a first set of candidates for first DCI that supports scheduling communications with any one or more of a set of multiple cells and a set of multiple second sets of candidates, one or more second sets of candidates for second DCI that supports scheduling communications with a respective single cell of the set of multiple cells, and means for monitoring the resource set for DCI that schedules communications via one or more cells of the set of multiple cells based on the one or more indications.

A non-transitory computer-readable medium storing code for wireless communication at a UE is described. The code may include instructions executable by a processor to receive one or more indications of a resource set for downlink control signaling, the resource set including: a first set of candidates for first DCI that support scheduling communications with any one or more of a set of multiple cells and a set of multiple second sets of candidates, one or more second sets of candidates for second DCI that support scheduling communications with a respective single cell of the set of multiple cells and monitor the resource set for DCI that schedules communications via one or more cells of the set of multiple cells based on the one or more indications.

Some examples of the method, apparatuses, and non-transitory computer-readable medium described herein may further include operations, features, means, or instructions for receiving one or more instances of DCI based on the monitoring, and communicating via at least one cell of the set of multiple cells based on the received one or more instances of DCI.

In some examples of the method, apparatuses, and non-transitory computer-readable medium described herein, the monitoring may include operations, features, means, or instructions for monitoring for one or more first DCI formats in the first set of candidates, or monitoring for one or more second DCI formats in one or more second sets of candidates, or a combination thereof.

In some examples of the method, apparatuses, and non-transitory computer-readable medium described herein, the monitoring may include operations, features, means, or instructions for monitoring the resource set in accordance with a configured first quantity of instances of a first format of the first DCI in the first set of candidates during a slot of a scheduling cell, or a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

In some examples of the method, apparatuses, and non-transitory computer-readable medium described herein, the monitoring may include operations, features, means, or instructions for refraining from monitoring at least a portion of the set of multiple second sets of candidates during the slot of the scheduling cell based on receiving an instance of the first format of the first DCI during the slot of a scheduling cell, or refraining from monitoring at least a portion of the first set of candidates during the slot of the scheduling cell based on receiving an instance of the second format of the second DCI during the slot of a scheduling cell.

In some examples of the method, apparatuses, and non-transitory computer-readable medium described herein, the monitoring may include operations, features, means, or instructions for monitoring the resource set in accordance with each cell of the set of multiple cells being operable for scheduling with a configured first quantity of instances of a first format of the first DCI in the first set of candidates during a slot of a scheduling cell, or a with a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

In some examples of the method, apparatuses, and non-transitory computer-readable medium described herein, the monitoring may include operations, features, means, or instructions for refraining from monitoring at least a portion of the set of multiple second sets of candidates, corresponding to one or more of the set of multiple cells, during the slot of the scheduling cell based on receiving an instance of the first format of the first downlink information during the slot of a scheduling cell associated with scheduling communications of the one or more of the set of multiple cells.

In some examples of the method, apparatuses, and non-transitory computer-readable medium described herein, the monitoring may include operations, features, means, or instructions for monitoring the resource set in accordance with a configured first quantity of instances of a first format of the first DCI in the first set of candidates during a slot of a scheduling cell, and a configured second quantity of instances of a second format of the second DCI in each second set of candidates during a slot of a scheduling cell.

Some examples of the method, apparatuses, and non-transitory computer-readable medium described herein may further include operations, features, means, or instructions for transmitting an indication of a capability for multiple-cell scheduling, where receiving at least one of the one or more indications of the resource set for downlink control signaling may be based on transmitting the indication of the capability for multiple-cell scheduling.

In some examples of the method, apparatuses, and non-transitory computer-readable medium described herein, receiving the one or more indications of the resource set may include operations, features, means, or instructions for receiving an indication that associates the first set of candidates with a pool of downlink control resources of one of the cells of the set of multiple cells.

In some examples of the method, apparatuses, and non-transitory computer-readable medium described herein, receiving the one or more indications of the resource set may include operations, features, means, or instructions for receiving a respective indication of at least one second set of candidates via the respective cell.

In some examples of the method, apparatuses, and non-transitory computer-readable medium described herein, receiving the one or more indications of the resource set may include operations, features, means, or instructions for receiving at least one indication of the resource set via a cell not included in the set of multiple cells.

In some examples of the method, apparatuses, and non-transitory computer-readable medium described herein, receiving the one or more indications of the resource set may include operations, features, means, or instructions for receiving at least one indication of the resource set via radio resource control (RRC) signaling.

In some examples of the method, apparatuses, and non-transitory computer-readable medium described herein, the first set of candidates may be associated with a first set of CCEs during a slot of a scheduling cell, and one or more second sets of candidates may be associated with a respective second set of CCEs during the slot of the scheduling cell.

In some examples of the method, apparatuses, and non-transitory computer-readable medium described herein, the monitoring may include operations, features, means, or instructions for monitoring the resource set for DCI that schedules uplink communications, or schedules downlink communications, or schedules a combination of uplink communications and downlink communications based on the one or more indications.

A method for wireless communication at a network entity is described. The method may include outputting one or more indications of a resource set for downlink control signaling, the resource set including a first set of candidates for first DCI that supports scheduling communications with any one or more of a set of multiple cells, and a set of multiple second sets of candidates, one or more second sets of candidates for second DCI that supports scheduling communications with a respective single cell of the set of multiple cells, outputting, based on outputting the one or more indications, one or more instances of DCI that schedules communications with a UE via one or more cells of the set of multiple cells, and communicating with the UE via at least one cell of the set of multiple cells based on outputting the one or more instances of DCI.

An apparatus for wireless communication at a network entity is described. The apparatus may include a processor, memory coupled with the processor, and instructions stored in the memory. The instructions may be executable by the processor to cause the apparatus to output one or more indications of a resource set for downlink control signaling, the resource set including a first set of candidates for first DCI that support scheduling communications with any one or more of a set of multiple cells, and a set of multiple second sets of candidates, one or more second sets of candidates for second DCI that support scheduling communications with a respective single cell of the set of multiple cells, output, based on outputting the one or more indications, one or more instances of DCI that schedules communications with a UE via one or more cells of the set of multiple cells, and communicate with the UE via at least one cell of the set of multiple cells based on outputting the one or more instances of DCI.

Another apparatus for wireless communication at a network entity is described. The apparatus may include means for outputting one or more indications of a resource set for downlink control signaling, the resource set including a first set of candidates for first DCI that supports scheduling communications with any one or more of a set of multiple cells, and a set of multiple second sets of candidates, one or more second sets of candidates for second DCI that supports scheduling communications with a respective single cell of the set of multiple cells, means for outputting, based on outputting the one or more indications, one or more instances of DCI that schedules communications with a UE via one or more cells of the set of multiple cells, and means for communicating with the UE via at least one cell of the set of multiple cells based on outputting the one or more instances of DCI.

A non-transitory computer-readable medium storing code for wireless communication at a network entity is described. The code may include instructions executable by a processor to output one or more indications of a resource set for downlink control signaling, the resource set including a first set of candidates for first DCI that support scheduling communications with any one or more of a set of multiple cells, and a set of multiple second sets of candidates, one or more second sets of candidates for second DCI that support scheduling communications with a respective single cell of the set of multiple cells, outputting, based on outputting the one or more indications, one or more instances of DCI that schedules communications with a UE via one or more cells of the set of multiple cells, and communicate with the UE via at least one cell of the set of multiple cells based on outputting the one or more instances of DCI.

In some examples of the method, apparatuses, and non-transitory computer-readable medium described herein, outputting the one or more instances of DCI may include operations, features, means, or instructions for outputting one or more first DCI formats in the first set of candidates, or outputting one or more second DCI formats in one or more second sets of candidates, or a combination thereof.

In some examples of the method, apparatuses, and non-transitory computer-readable medium described herein, outputting the one or more instances of DCI may include operations, features, means, or instructions for outputting one or more instances of a first format of the first DCI in the first set of candidates during a slot of a scheduling cell, or one or more instances of a second format of the second DCI in one or more second sets of candidates during the slot of the scheduling cell, but not an instance of the first format of the first DCI in the first set of candidates and an instance of the second format of the second DCI in any of the second sets of candidates during the slot of the scheduling cell.

In some examples of the method, apparatuses, and non-transitory computer-readable medium described herein, outputting the one or more instances of DCI may include operations, features, means, or instructions for outputting one or more instances of a first format of the first DCI in the first set of candidates during a slot of a scheduling cell to schedule communications via a cell of the set of multiple cells, or one or more instances of a second format of the second DCI in the second set of candidates corresponding to the cell during the slot of a scheduling cell to schedule communications via the cell, but not an instance of the first format of the first DCI in the first set of candidates and an instance of the second format of the second DCI the second set of candidates during the slot of the scheduling cell to schedule communications via the cell.

In some examples of the method, apparatuses, and non-transitory computer-readable medium described herein, outputting the one or more instances of DCI may include operations, features, means, or instructions for outputting one or more instances of a first format of the first DCI in the first set of candidates during a slot of a scheduling cell, and one or more instances of a second format of the second DCI in one or more second sets of candidates during the slot of the scheduling cell.

Some examples of the method, apparatuses, and non-transitory computer-readable medium described herein may further include operations, features, means, or instructions for obtaining an indication of a capability of the UE for multiple-cell scheduling, where outputting at least one of the one or more indications of the resource set for downlink control signaling may be based on obtaining the indication of the capability for multiple-cell scheduling.

In some examples of the method, apparatuses, and non-transitory computer-readable medium described herein, outputting the one or more indications of the resource set may include operations, features, means, or instructions for outputting an indication that associates the first set of candidates with a pool of downlink control resources of one of the cells of the set of multiple cells.

In some examples of the method, apparatuses, and non-transitory computer-readable medium described herein, outputting the one or more indications of the resource set may include operations, features, means, or instructions for outputting a respective indication of at least one second set of candidates via the respective cell.

In some examples of the method, apparatuses, and non-transitory computer-readable medium described herein, outputting the one or more indications of the resource set may include operations, features, means, or instructions for outputting at least one indication of the resource set via a cell not included in the set of multiple cells.

In some examples of the method, apparatuses, and non-transitory computer-readable medium described herein, outputting the one or more indications of the resource set may include operations, features, means, or instructions for outputting at least one indication of the resource set via RRC signaling.

In some examples of the method, apparatuses, and non-transitory computer-readable medium described herein, the first set of candidates may be associated with a first set of CCEs during a slot of a scheduling cell and one or more second sets of candidates may be associated with a respective second set of CCEs during the slot of the scheduling cell.

In some examples of the method, apparatuses, and non-transitory computer-readable medium described herein, outputting the one or more instances of DCI may include operations, features, means, or instructions for outputting at least one instance of DCI that schedules uplink communications, or that schedules downlink communications, or that schedules a combination of uplink communications and downlink communications.

DETAILED DESCRIPTION

Figure 1:
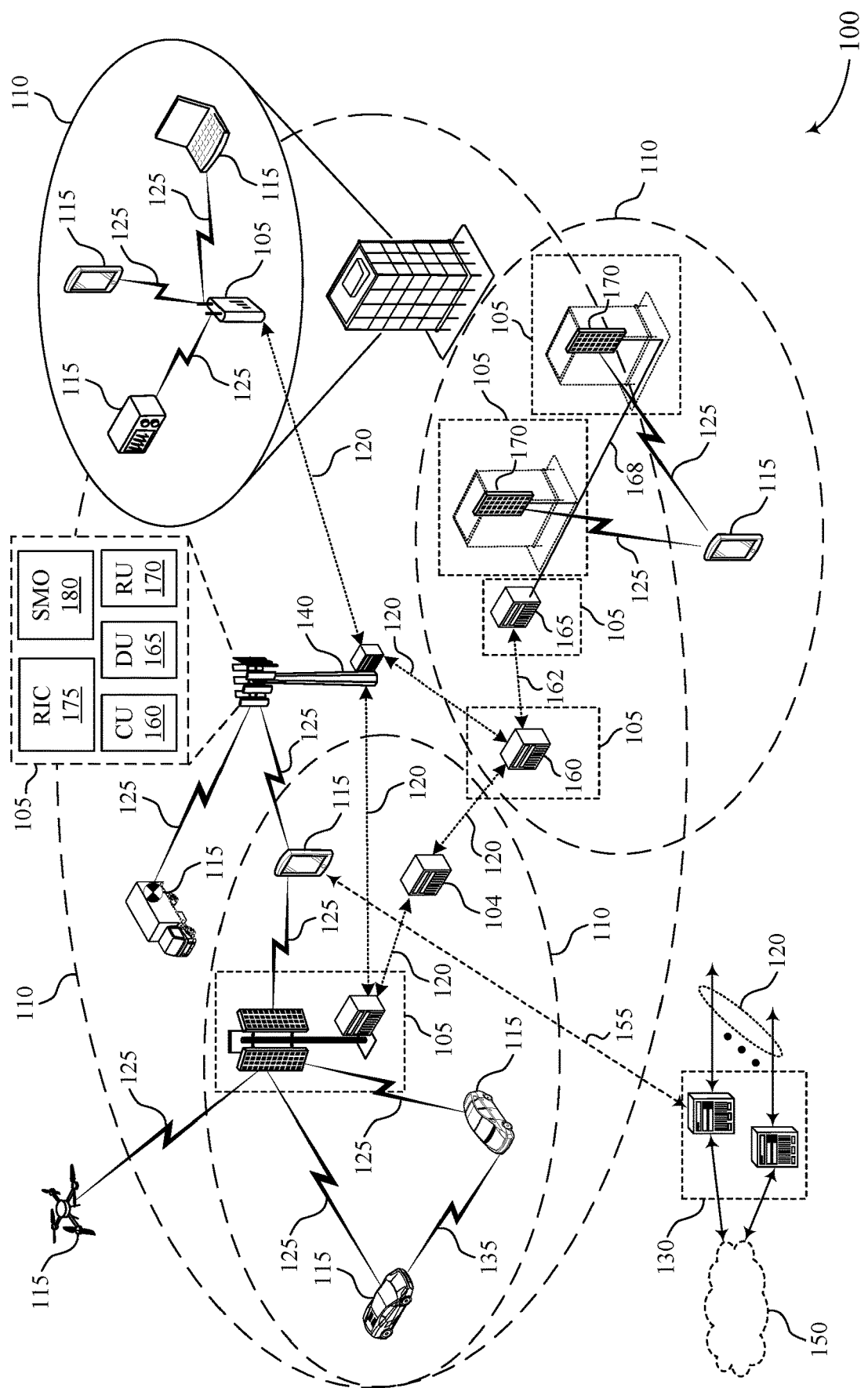
FIG. 1 illustrates an example of a wireless communications system that supports techniques for processing DCI for scheduling multiple cells in accordance with one or more aspects of the present disclosure.

A user equipment (UE) may be configured to support communications (e.g., uplink communications, downlink communications, or both) with a network via a set of multiple cells, which may be scheduled by a network entity using one or more instances of downlink control information (DCI). Communications via the set of cells may be scheduled via single-cell scheduling techniques or multi-cell scheduling techniques. For single-cell scheduling, a cell of the set may be used to convey DCI that schedules communications via the same cell (e.g., for self-scheduling of communications via a same carrier that carries the DCI, for cross-carrier scheduling of communications via a set of carriers that may be different than a carrier that carries the DCI). For multi-cell scheduling (e.g., cross-cell scheduling), a cell may be used convey one or more instances of DCI that schedules communications via any one or more cells of the set.

In some implementations, DCI formats may be defined for different types of scheduling and for different types of communication. For example, DCI formats for single-cell scheduling may include one or more formats for scheduling uplink communications (e.g., DCI formats 0_0, 0_1, and 0_2) and one or more formats for scheduling downlink communications (e.g., DCI formats 1_0, 1_1, 1_2). DCI formats for multi-cell scheduling also may include one or more formats for scheduling uplink communications (e.g., DCI format 0_X) and one or more formats for scheduling downlink communications (e.g., DCI format 1_X).

In some examples, DCI may be received by a UE via a configured set of communications resources that are allocated for blind decoding of control signaling candidates (e.g., blind decode (BD) candidates, physical downlink control channel (PDCCH) candidates, control channel element (CCE) candidates), which may be configured in accordance with one or more search spaces. A UE may attempt to blindly decode such candidates to attempt to identify instances of DCI that are directed to the UE, such as instances of scheduling DCI (e.g., instances of DCI that schedule uplink communications for the UE, instances of DCI that schedule downlink communications for the UE). However, specific combinations of DCI formats that are to be supported by the UE in a given monitoring duration, including combinations of formats of self-scheduling DCI and formats of cross-cell scheduling DCI, may not be explicitly configured.

In accordance with examples as disclosed herein, a network entity and a UE may be configured to support at least some combinations of DCI formats and, in some examples, exclude some other combinations of DCI formats, in a given monitoring duration. For example, a configured set of cells may be associated with a scheduling cell, and repeating occasions of a monitoring duration associated with the scheduling cell (e.g., a monitoring interval, a slot of the scheduling cell). During a monitoring duration, the network entity may transmit instances of DCI (e.g., instances of certain DCI formats) via one or more cells of a set that satisfy criteria for combinations of single-cell scheduling DCI and multi-cell scheduling DCI, such that the UE may blindly decode candidates of one or more search spaces in accordance with the criteria for the combinations. In some examples, during a given monitoring duration, the UE may be expected to process single-cell scheduling DCI, or multi-cell scheduling DCI, but not both. In some other examples, during a given monitoring duration, the UE may be expected to process single-cell scheduling DCI that schedules a given cell, or multi-cell scheduling DCI that schedules a given cell, but not both single-cell scheduling DCI and multi-cell scheduling DCI that schedules a given cell. In some implementations, the UE may indicate a capability to support various combinations of DCI, which may be associated with a hardware capability or a performance mode or capability of the UE, or may be an indication of one or more configurations for combinations that are enabled at the UE. In accordance with these and other examples for criteria for combining single-cell scheduling DCI and multi-cell scheduling DCI in a given monitoring duration, a communications system may be configured in a manner that simplifies blind decoding of one or more search spaces, which may support reduced power consumption, reduced processor utilization, or reduced latency at a UE, among other advantages.

Aspects of the disclosure are initially described in the context of wireless communications systems. Aspects of the disclosure are further illustrated by and described with reference to a signaling architecture, signaling scenarios, and a process flow. Aspects of the disclosure are further illustrated by and described with reference to apparatus diagrams, system diagrams, and flowcharts that relate to techniques for processing DCI for scheduling multiple cells.

FIG. 1 illustrates an example of a wireless communications system 100 that supports techniques for processing DCI for scheduling multiple cells in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for processing DCI for scheduling multiple cells as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, UEs 115 may be configured to monitor one or more search spaces for DCI, including DCI that schedules communications for the UEs 115. Some such techniques (e.g., in a carrier aggregation (CA) configuration) may be associated self-scheduling DCI (e.g., which may be associated with single-cell scheduling), for which a UE 115 blindly decodes PDCCH candidates for DCI that may schedule communications of the same carrier as the PDCCH candidates. For example, self-scheduling may be associated with a quantity of BD candidates (e.g., up to M BD candidates) and a quantity of CCEs (e.g., up to C CCEs). In some examples of self-scheduling, PDCCH transmissions from a given cell may be associated with a quantity of DCI formats (e.g., up to 4 DCI formats, up to 6 DCI formats) and a quantity of DCI sizes (e.g., up to 4 DCI sizes). Additionally, or alternatively, some such techniques may be associated with cross-carrier scheduling techniques (e.g., which also may be associated with single-cell scheduling), for which a UE 115 blindly decodes PDCCH candidates for DCI that may schedule communications of different carriers than the carrier associated with the PDCCH candidates, which may be on a same cell. For example, for each carrier of a set of carriers that may be indicated in by PDCCH of a single carrier, cross-carrier scheduling may be associated with a quantity of BDs (e.g., up to M BDs) and a quantity of CCEs (e.g., up to C CCEs), that may carry DCI that schedules communications using one or more carriers of a configured set of carriers (e.g., of a CA configuration).

In some blind decoding techniques, for each scheduled cell, a UE 115 may not monitor (e.g., may not be required to monitor, may not be expected to monitor) more than a quantity (e.g., a configured quantity, a threshold quantity) of PDCCH candidates or more than a quantity of non-overlapped CCEs per monitoring duration (e.g., per slot). For example, a UE 115 may not monitor more than a quantity of PDCCH candidates (e.g., BD candidates) or more than a quantity of non-overlapped CCEs per slot on an active downlink bandwidth part with subcarrier spacing (SCS) configuration (e.g., u) of a scheduling cell. In some examples, a UE 115 may be configured with one or more common search space (CSS) sets that result to corresponding total, or per scheduled cell, quantities of monitored PDCCH candidates (e.g., M BD candidates) and non-overlapped CCEs (e.g., (') per slot that exceed the corresponding threshold quantity (e.g., maximum).

In some examples of multi-cell scheduling (e.g., cross-cell scheduling), a cell may support multiple formats of DCI scheduling. For example, the DCI formats for multi-cell scheduling (e.g., DCI format 0_X for multi-cell uplink scheduling, DCI format 1_X for multi-cell downlink scheduling) and the DCI formats for single-cell scheduling (e.g., for self-scheduling or cross-carrier scheduling, DCI formats 0_0, 0_1, 0_2 for single-cell uplink scheduling, DCI formats 1_0, 1_1, 1_2 for single-cell downlink scheduling) may be simultaneously monitored by the UE 115, such as if the cell supports co-scheduling (e.g., by DCI format for multi-cell scheduling and a DCI format for single-cell scheduling) and the DCI is configured from a same scheduling cell.

For a set of cells configured for multi-cell scheduling, a DCI size budget (e.g., a search space size) may be maintained on each cell of the set of cells. In some implementations, a DCI size of DCI format 0_X or 0_1 may be counted on one cell among the set of cells, and BD or CCE candidates for DCI format 0_X or 1_X may be counted on one cell among the set of cells. For example, the BD and CCE quantity may be counted on the cell. In some examples, a search space of DCI format 0_X or 0_1 may be configured on one cell of the set of cells, and may be associated with the search space of a scheduling cell with the same search space identifier. The UE 115 may support a quantity of M BD candidates and a quantity of C CCE candidates (e.g., in a given monitoring duration, such as a slot of a scheduling cell).

The techniques described herein may provide for configuring one or more combinations of DCI formats (e.g., which combinations of single-cell scheduling and multi-cell scheduling DCI formats, during a monitoring duration) that are to be supported by a network entity 105 and connected UEs 115. For example, a network entity 105 and a UE 115 may be configured to support at least some combinations of DCI formats and, in some examples, exclude some other combinations of DCI formats, in a given monitoring duration. For example, a configured set of cells may be associated with a scheduling cell, and repeating occasions of a monitoring duration associated with the scheduling cell (e.g., a slot of the scheduling cell). During a monitoring duration, the network entity may transmit instances of DCI (e.g., of certain DCI formats) that satisfy a criteria for combinations of single-cell scheduling DCI and multi-cell scheduling DCI, such that the UE may blindly decode candidates of one or more search spaces in accordance with the criteria for the combinations. Accordingly, the wireless communications system 100 may be configured in a manner that simplifies blind decoding of one or more search spaces, which may support reduced power consumption, reduced processor utilization, or reduced latency at a UE 115, among other advantages.

Figure 2:
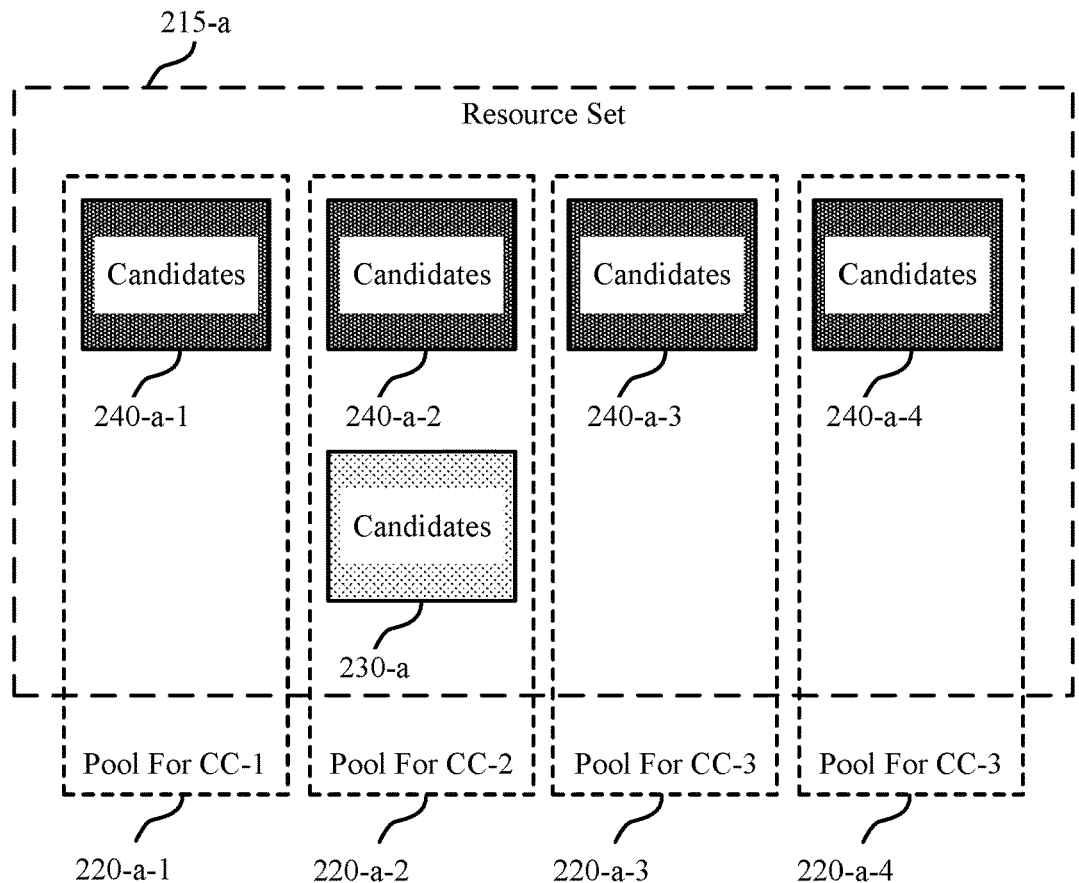
FIG. 2 illustrates an example of a signaling architecture that supports techniques for processing DCI for scheduling multiple cells in accordance with one or more aspects of the present disclosure.
Figure 2:
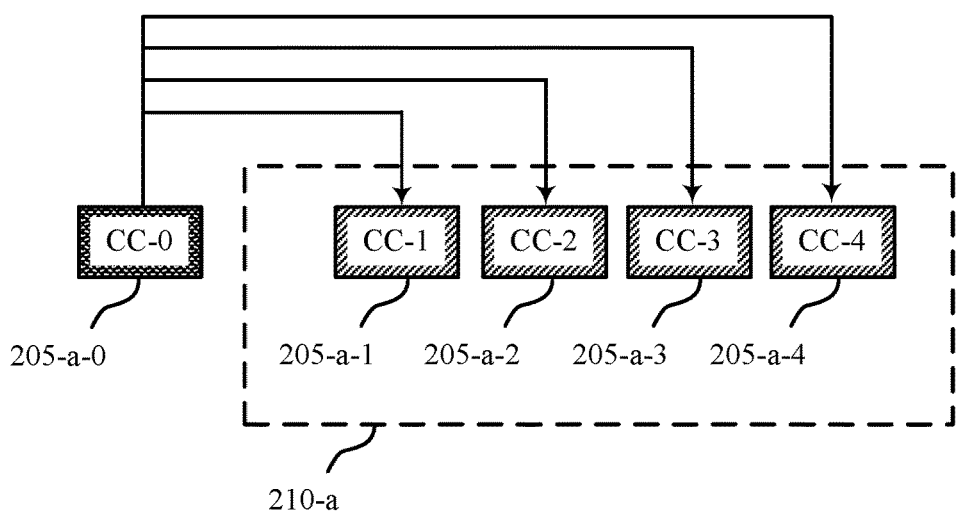

FIG. 2 illustrates an example of a signaling architecture 200 that supports techniques for processing DCI for scheduling multiple cells in accordance with one or more aspects of the present disclosure. The signaling architecture 200 may be associated with cells 205 (e.g., cells 205-a-0, 205-a-1, 205-a-2, 205-a-3, 205-a-4), each of which may be an example of a cell as described herein. In various examples, at least one cell 205 (e.g., each cell 205) may be associated with a respective network entity 105, or a network entity 105 may be associated with more than cell 205. For example, one or more of the cells 205 may be associated with a respective base station 140, a respective CU 160, a respective DU 165, or a respective RU 170, among other examples or combinations thereof. In some examples, the cell 205-a-0 may be configured as a scheduling cell, which may include a logical association or a physical association (e.g., with a network entity 105) for coordinating (e.g., determining, scheduling) communications of a set 210-a (e.g., a set of cells including at least the cells 205-a-1, 205-a-2, 205-a-3, and 205-a-4, a set of cells {1,2,3,4}). The cell 205-a-0 may be a cell that is different than the other cells 205-a, or may be a logical entity that communicates via resources of one or more of the cells 205-a of the set 210-a (e.g., a logical entity that is configured with a communications association with one of the cells 205-a of the set 210-a). In some such examples, the cell 205-a-0 may be associated with a CU 160 or a DU 165, and each of the cells 205-a-1, 205-a-2, 205-a-3, and 205-a-a may be associated with a respective RU 170 that is in communication with the CU 160 or DU 165, among other examples.

The signaling architecture 200 illustrates an example of a resource set 215-a that may support downlink control signaling for single-cell scheduling of respective cells 205-a of the set 210-a or multi-cell scheduling (e.g., cross-cell scheduling) of the set 210-a. Resources of a resource set 215 may refer to resources in the frequency domain, resources in the time domain (e.g., repeating occasions of resources in a series of monitoring durations over time), resources in the spatial domain, or a combination thereof. In some examples, resources of a resource set 215 may refer to control channel resources, such as resources of a PDCCH or other physical control channel. In some examples, a resource set 215 may refer to BD or CCE pools in a slot of a scheduling cell, such as the cell 205-a-0. A resource set 215 may support the communication of DCI of various formats for scheduling communications between a UE 115 and a network entity 105 (e.g., unicast communications). For example, a resource set 215 may support the communication of DCI formats for scheduling uplink communications (e.g., DCI formats 0_0, 0_1, 0_2, or 0_X, or a combination thereof, for scheduling PUSCH communications), or for scheduling downlink communications (e.g., DCI formats 1_0, 1_1, 1_2, or 1_X, or a combination thereof, for scheduling PDSCH communications), or both.

A resource set 215 may include at least a portion of respective pools of resources for each cell 205 of a set 210. For example, the resource set 215-a may include at least a portion of a pool 220-a-1 associated with the cell 205-a-1, at least a portion of a pool 220-a-2 associated with the cell 205-a-2, at least a portion of a pool 220-a-3 associated with the cell 205-a-3, and at least a portion of a pool 220-a-4 associated with the cell 205-a-4. Each pool may include candidate control channel resources (e.g., CCEs, BD candidates, PDCCH candidates) for a UE 115 to monitor for control information (e.g., by way of blind decoding).

In some implementations, candidate resources of the pools 220 may be divided between resources associated with different DCI formats. For example, each pool 220 may be associated with candidates 240 (e.g., pool 220-a-1 being associated with candidates 240-a-1, and so on), and candidates 240 may be associated with resources for single-cell scheduling (e.g., for DCI that supports scheduling communications via the respective cell, such as DCI formats 0_0, 0_1, 0_2, 1_0, 1_1, 1_2 or various combinations thereof, for cross-carrier scheduling). For example, candidates 240-a-1 may support single-cell scheduling of communications with a UE 115 via the cell 205-a-1, and so on. At least one pool 220 may also be associated with candidates 230 (e.g., pool 220-a-2 being associated with candidates 230-a), and candidates 230 may be associated with resources for multi-cell scheduling (e.g., for DCI that supports scheduling communications with any one or more of the cells 205-a of the set 210-a, such as DCI formats 0_X, 1_X, or a combination thereof). For example, candidates 230-a may support multi-cell scheduling of communications with a UE 115 via any one or more of the cell 205-a-1, the cell 205-a-2, the cell 205-a-3, and the cell 205-a-4 (e.g., of the set 210-a).

Resources of a resource set 215 may be configured and indicated by one or more network entities 105 (e.g., via one or more cells 250), and a UE 115 may receive one or more indications of the resource set 215-a. Thus, a UE 115 may receive one or more indications of candidates 230 (e.g., a first set of candidates) for multi-cell scheduling and resource candidates 240 (e.g., multiple second sets of candidates) for single-cell scheduling (e.g., cross-carrier scheduling). In some examples, the resource set 215 may be considered to be resources that are monitored on the cell 205-*a*-0. In some examples, a scheduling cell (e.g., a coordinating cell, such as cell 205-*a*-0), may be used to transmit one or more indications that indicate (e.g., entirely indicate) a resource set 215 (e.g., including an association of candidates 230 and candidates 240 with various cells 205 of a set 210). Additionally, or alternatively, one or more cells 205 of a set 210 may be used to transmit one or more indications of a resource set 215, such as indications for a respective pool 220 or respective candidates 240. In some such examples, a UE 115 may receive a separate indication of candidates 230 (e.g., via a cell 205 in the set 210, via a cell 205 that is not in the set 210), such as receiving an indication that associates candidates 230 with one or more cells 205 of a set 210 (e.g., indicating a presence of candidates 230-*a* in the pool 220-*a*-2 or otherwise associated with the cell 205-*a*-2). In some examples, such indications may be received via radio resource control (RRC) signaling, such as during connection establishment or maintenance signaling, which may support dynamic scheduling of blind decoding resources, establishment or updating of cells 205 included in a set 210, among other benefits.

A UE 115 may be configured to monitor for multi-cell scheduling DCI (e.g., DCI format 0_X, or 1_X, or both) on a scheduling cell (e.g., cell 205-*a*-0, a slot of a scheduling cell, a slot having timing that is synchronized among the cells 205-*a* of the set 210-*a*) that can schedule cross-cells (CCs) of a set 210 (e.g., cells 205-*a*-1, 205-*a*-2, 205-*a*-3, and 205-*a*-4). Such multi-cell scheduling DCI may schedule communications (e.g., uplink communications, downlink communications, or both) via any one or more of the cells 205 of the set 210. In the example of signaling architecture 200, the candidates 230-*a* (e.g., the search space set for monitoring DCI for multi-cell scheduling) may be configured in resources of the cell 205-*a*-2 (e.g., in the pool 220-*a*-2). The size of BD, CCEs, or DCI for the multi-cell scheduling DCI may be counted on the cell 205-*a*-2 (e.g., on the pool 220-*a*-2).

Additionally, or alternatively, a UE 115 may be configured to monitor for single-cell scheduling DCI (e.g., DCI formats 0_0, 0_1, 0_2, 1_0, 1_1, or 1_2, or any combination thereof) on the scheduling cell (e.g., cell 205-*a*-0) for each of the cells 205-*a* of the set 210-*a*. Such single-cell scheduling DCI may schedule communications (e.g., uplink communications, downlink communications, or both) via the same cell 205 as the resource pool 220 over which the scheduling DCI is received. In the example of signaling architecture 200, the candidates 240-*a* (e.g., the search space set for monitoring DCI for single-cell scheduling) may be configured per cell 205-*a* of the set 210-*a* (e.g., candidates 240-*a*-1 may be configured for cell 205-*a*-1, etc.). The size of BD, CCEs, or DCI for the single-cell scheduling DCI may be counted on each cell 205-*a* of the set 210-*a* (e.g., in each of the pools 220-*a*).

In some examples, the candidates 230-*a* and the candidates 240-*a* may be associated with a monitoring duration (e.g., a monitoring interval, a monitoring occasion), such as a blind decoding interval (e.g., a duration of a PDCCH monitoring occasion, a duration of a CORESET for the monitored PDCCH), which may be associated with a TTI or other transmission interval. In some implementations, the monitoring duration may be a slot of a scheduling cell, such as a slot of the cell 205-*a*-0. During a blind decoding operation, a UE 115 may monitor candidates 240 for a configured quantity of instances of single-cell scheduling DCI (e.g., a quantity of uplink single-cell scheduling DCI, a quantity of downlink single-cell scheduling DCI, or a combination thereof). Thus, during a given monitoring duration, a network entity 105 may output up to the configured quantity of instances of single-cell scheduling DCI and expect that the UE 115 is capable of processing the output instances of single-cell scheduling DCI. If the UE 115 receives (e.g., decodes) the configured quantity of instances of single-cell scheduling DCI (e.g., for scheduling communications with the UE 115), the UE 115 may refrain from blindly decoding remaining instances of the candidates 240 during the monitoring duration (e.g., with the expectation that a network entity 105 would not output more than the configured quantity of single-cell scheduling DCI).

Additionally, or alternatively, the UE 115 may monitor candidates 230 for a configured quantity of instances of multi-cell scheduling DCI (e.g., a quantity of uplink multi-cell scheduling DCI, a quantity of downlink multi-cell scheduling DCI, or a combination thereof). Thus, during a given monitoring duration, a network entity 105 may output up to the configured quantity of instances of multi-cell scheduling DCI and expect that the UE 115 is capable of processing the output instances of multi-cell scheduling DCI. If the UE 115 receives (e.g., decodes) the configured quantity of instances of multi-cell scheduling DCI (e.g., for scheduling communications with the UE 115), the UE 115 may refrain from blindly decoding remaining instances of the candidates 230 during the monitoring duration (e.g., with the expectation that a network entity 105 would not output more than the configured quantity of single-cell scheduling DCI). Although described in the context of separate candidates 230 and 240 among pools 220 of a set 210, in some other examples, a UE 115 may be configured more-generally to blindly decode one or more formats of DCI in candidates of one or more pools 220, which may include blindly decoding for single-cell scheduling DCI and multi-cell scheduling DCI in the same candidates of a given cell 205 of a set 210.

UEs 115 may be configured to support various quantities of instances of scheduling DCI. In some implementations, quantities of scheduling DCI may be based on a type of duplexing used for communications, such as scheduling DCI for frequency division duplexed (FDD) communications and time division duplexed (TDD) communications. For example, UEs 115 may be configured to support processing one unicast DCI scheduling downlink and one unicast DCI scheduling uplink per slot per scheduled cell 205 (e.g., per CC, per scheduled cell 205 of the set 210) for FDD, or processing one unicast DCI scheduling downlink and two unicast DCI scheduling uplink per slot per scheduled cell for TDD. In some examples, a UE 115 may be configured to support span-based PDCCH monitoring. Such a UE 115 may support, for a set of monitoring occasions within a same span: processing one unicast DCI scheduling downlink and one unicast DCI scheduling uplink per scheduled cell 205 across this set of monitoring occasions for FDD, processing one unicast DCI scheduling downlink and two unicast DCI scheduling uplink per scheduled cell 205 across this set of monitoring occasions for TDD, or processing two unicast DCI scheduling downlink and one unicast DCI scheduling uplink per scheduled cell across this set of monitoring occasions for TDD.

In some examples, a UE 115 may be configured to support cross-carrier scheduling (CCS) with different SCS (e.g., different numerologies) for scheduling or scheduled cells 205. For downlink or uplink CCS from lower SCS to higher SCS, such a UE 115 may be configured to support: processing one unicast DCI scheduling downlink (or uplink) per slot of a scheduling cell 205 per scheduled cell 205 for an FDD scheduling cell 205, or processing one unicast DCI scheduling downlink (or uplink) per slot of a scheduling cell 205 per scheduled cell 205 for a TDD scheduling cell 205. Additionally, or alternatively, for downlink or uplink CCS from higher SCS to lower SCS, such a UE 115 may be configured to support: processing one unicast DCI scheduling downlink (or uplink) per quantity of (e.g., per N) consecutive slots of a scheduling cell 205 per scheduled cell 205 for an FDD scheduling cell 205, or processing one unicast DCI scheduling downlink (or uplink) per quantity of consecutive slots of a scheduling cell 205 per scheduled cell 205 for a TDD scheduling cell 205. In some examples, N may be based on a pair of scheduling cell 205 SCS or scheduled cell 205 SCS (e.g., N=2 for (30,15), (60,30), (120,60) and N=4 for (60,5), (120,30), N=8 for (120,15)). In some examples, a UE 115 may indicate support of a quantity of unicast DCI (e.g., X, where X={1,2,4} for (15,120), (15,60), (30,120) and X={2} for (15,30), (30,60), (60,120 kHz).

For UEs 115 configured to support multi-cell scheduling DCI (e.g., DCI formats 1_X, 0_X, or both), many combinations of possible instances of DCI may be possible and the supported cases may not be clear. In some examples, a large quantity of supported combinations may be associated with relatively high resource utilization (e.g., processing resources, power consumption, latency) or complexity. In accordance with examples as disclosed herein, a wireless communications system may be configured to support at least some combinations of DCI formats and, in some examples, exclude some other combinations of DCI formats, for a resource set 215 in a given monitoring occasion. In some implementations, the UE 115 may indicate a capability to support various combinations of DCI, which may be associated with a hardware capability or a performance mode or capability of the UE 115, or may be an indication of one or more configurations for combinations that are enabled at the UE 115. Thus, the wireless communications system may be configured in a manner that simplifies blind decoding of one or more pools 220, which may support reduced power consumption, reduced processor utilization, or reduced latency at a UE 115, among other advantages.

Figure 3:
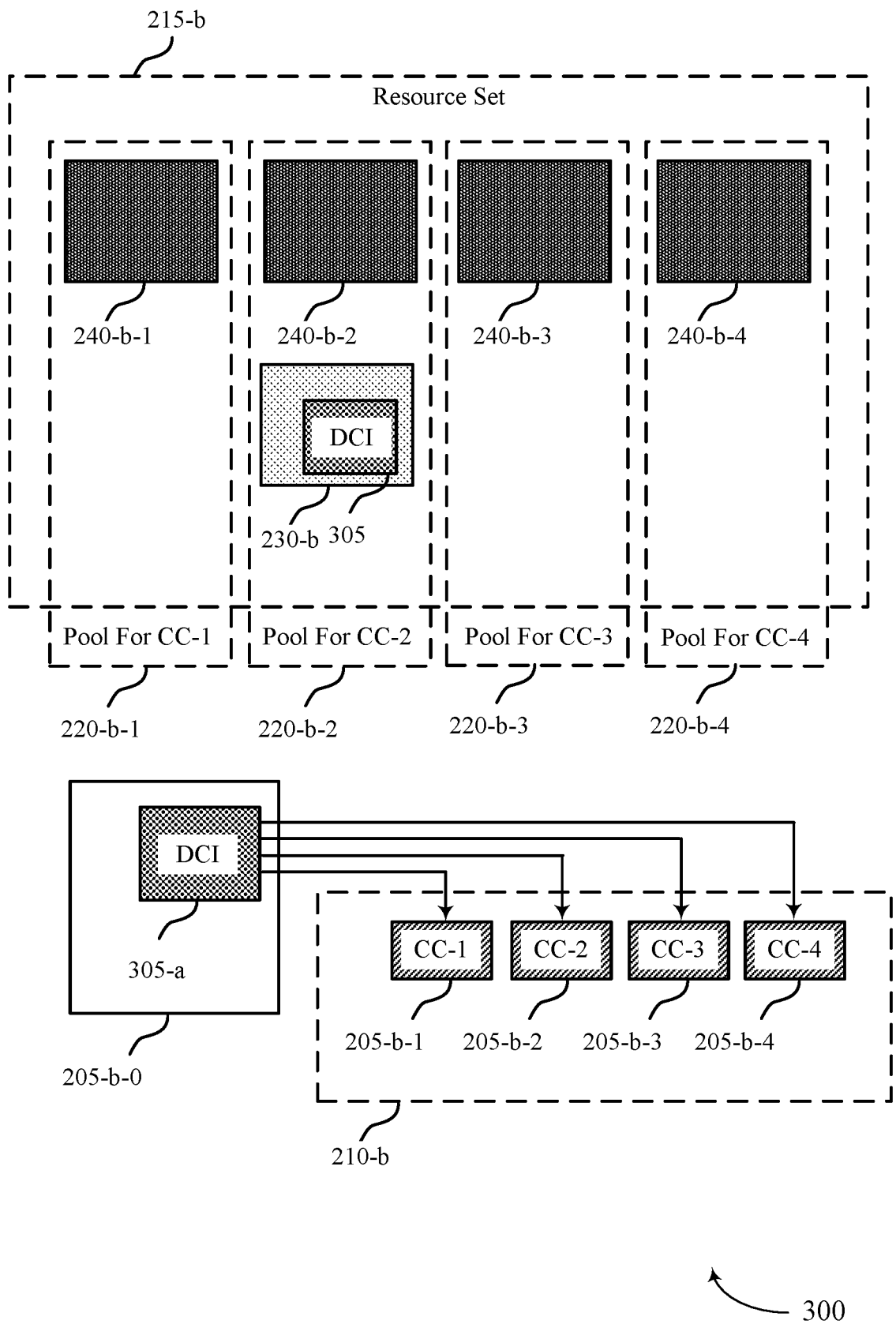
FIGS. 3 through 7 illustrate examples of signaling scenarios that support techniques for processing DCI for scheduling multiple cells in accordance with one or more aspects of the present disclosure.

FIG. 3 illustrates an example of a signaling scenario 300 that supports techniques for processing DCI for scheduling multiple cells in accordance with one or more aspects of the present disclosure. The signaling scenario 300 may illustrate an example of implementing aspects of the signaling architecture 200. For example, the signaling scenario 300 illustrates an example for implementing a resource set 215-*b* (e.g., resources of a scheduling cell 205-*b*-0 associated with pools 220-*b*, candidates 230-*b*, and candidates 240-*b*) for DCI that schedules communications via one or more cells 205-*b* of a set 210-*b*.

In the example of signaling scenario 300, a network entity 105 may output DCI 305 (e.g., via the scheduling cell 205-*b*-0, an instance of multi-cell scheduling DCI, such as an instance of DCI format 0_X or 1_X) using resources of the pool 220-*b*-2 (e.g., a candidate of the candidates 230-*b*). The DCI 305 may schedule communications with a UE 115 via any one or more of the cells 205-*b* (e.g., all of the cells 205-*b*) of the set 210-*b*. For example, the DCI 305 may indicate resources of one or more of the cells 205-*b* for uplink communications from the UE 115 (e.g., using DCI format 0_X), or resources of one or more of the cells 205-*b* for downlink communications to the UE 115 (e.g., using DCI format 1_X). Accordingly, the UE 115 may communicate via the indicated resources of the one or more cells 205-*b* based on receiving the DCI 305 via the scheduling cell 205-*b*-0.

To support the reception of the DCI 305, the UE 115 may be configured to monitor the pool 220-*b*-2 (e.g., the candidates 230-*b*) of the resource set 215-*b* on the scheduling cell 205-*b*-0 for a configured quantity of instances of multi-cell scheduling DCI (e.g., a configured quantity of instances of multi-cell scheduling DCI for uplink communications, a configured quantity of instances of multi-cell scheduling DCI for downlink communications) directed to the UE 115. If the UE 115 receives the DCI 305, the UE 115 may, in some examples, refrain from blindly decoding other candidates of at least the candidates 230-*b* (e.g., if the DCI 305 corresponds to the configured quantity of instances to be monitored by the UE 115). In some examples, the UE 115 also may be configured to monitor other candidates (e.g., candidates 240-*b*) of the resource set 215-*b* on the scheduling cell 205-*b*-0 for a configured quantity of instances of single-cell scheduling DCI directed to the UE 115.

Figure 4:
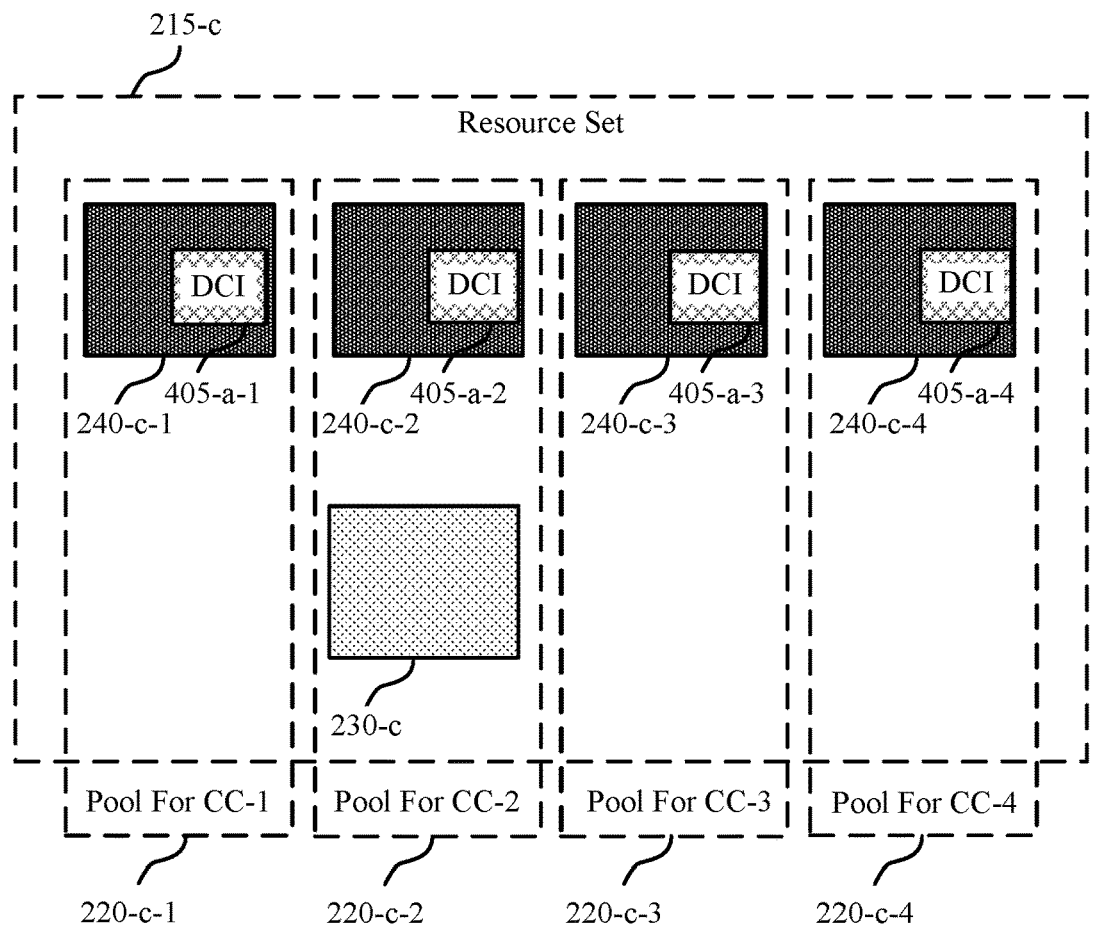
Figure 4:
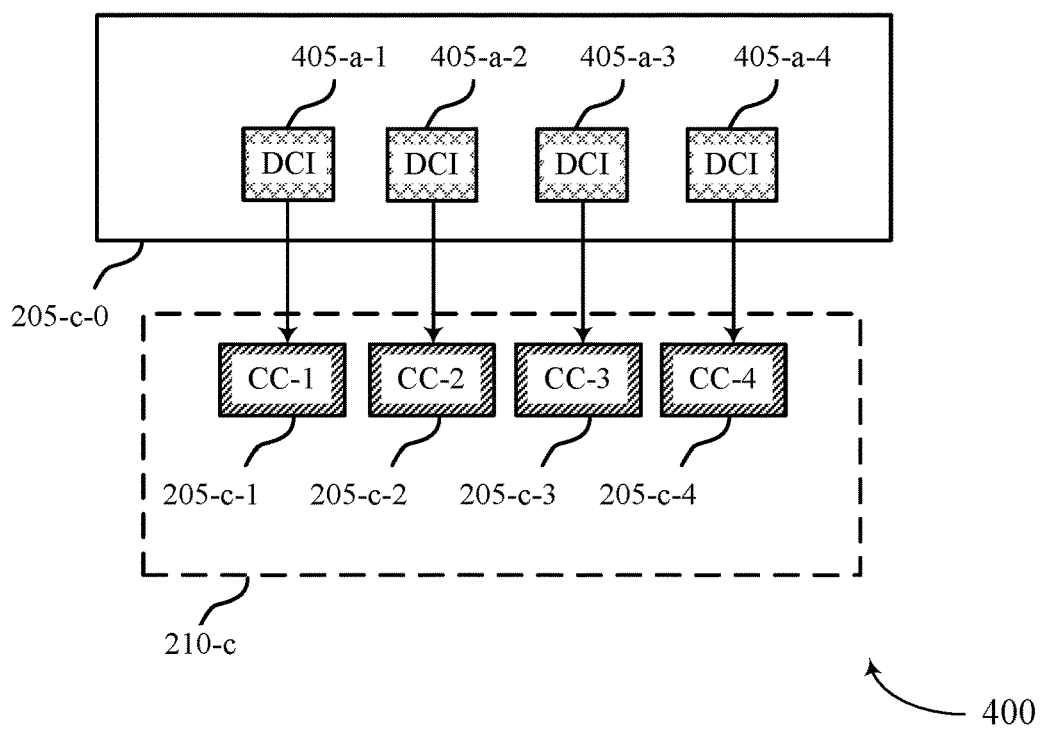

FIG. 4 illustrates an example of a signaling scenario 400 that supports techniques for processing DCI for scheduling multiple cells in accordance with one or more aspects of the present disclosure. The signaling scenario 400 may illustrate an example of implementing aspects of the signaling architecture 200. For example, the signaling scenario 400 illustrates an example for implementing a resource set 215-*c* (e.g., resources of a scheduling cell 205-*c*-0, associated with pools 220-*c*, candidates 230-*c*, and candidates 240-*c*) for DCI that schedules communications via one or more cells 205-*c* of a set 210-*c*.

In the example of signaling scenario 400, a network entity 105 may output DCI 405-*a*-1, DCI 405-*a*-2, DCI 405-*a*-3, and DCI 405-*a*-4 (e.g., via the scheduling cell 205-*c*-0, instances of single-cell scheduling DCI, such as instances of DCI format 0_0, 0_1, 0_2, 1_0, 1_1, or 1_2, or a combination thereof) using respective resources of pools 220-*c* (e.g., candidates of respective candidates 240-*c*). Each instance of DCI 405 may schedule respective communications with a UE 115 via a respective cell 205-*c* of the set 210-*c*. For example, the DCI 405-*a*-1 may indicate resources of the cell 205-*c*-1 for uplink communications from the UE 115 (e.g., using DCI format 0_0, 0_1, or 0_2), or resources of the cell 205-*c*-1 for downlink communications to the UE 115 (e.g., using DCI format 1_0, 1_1, or 1_2), and so on. Accordingly, the UE 115 may communicate via the indicated resources of the cells 205-*c*-1, 205-*c*-2, 205-*c*-3, and 205-*c*-4 based on receiving the DCI 405-*a*-1, 405-*a*-2, 405-*a*-3, and 405-*a*-4.

To support the reception of the DCI 405, the UE 115 may be configured to monitor each of the pools 220-*c* (e.g., each of the candidates 240-*c*) of the resource set 215-*c* on the scheduling cell 205-*b*-0 for a configured quantity of instances of single-cell scheduling DCI (e.g., a configured quantity of instances of single-cell scheduling DCI for uplink communications, a configured quantity of instances of single-cell scheduling DCI for downlink communications) directed to the UE 115. If the UE 115 receives an instance of DCI 405 in one of the candidates 240-*c*, the UE 115 may, in some examples, refrain from blindly decoding other candidates of the one of the candidates 240-*c* (e.g., if an instance of DCI 405 corresponds to the configured quantity of instances to be monitored by the UE 115 in candidates 240-*c* for a given cell 205-*c*). In some examples, the UE 115 also may be configured to monitor other candidates (e.g., candidates 230-*c*) of the resource set 215-*c* on the scheduling cell 205-c-0 for a configured quantity of instances of multi-cell scheduling DCI directed to the UE 115.

Figure 5:
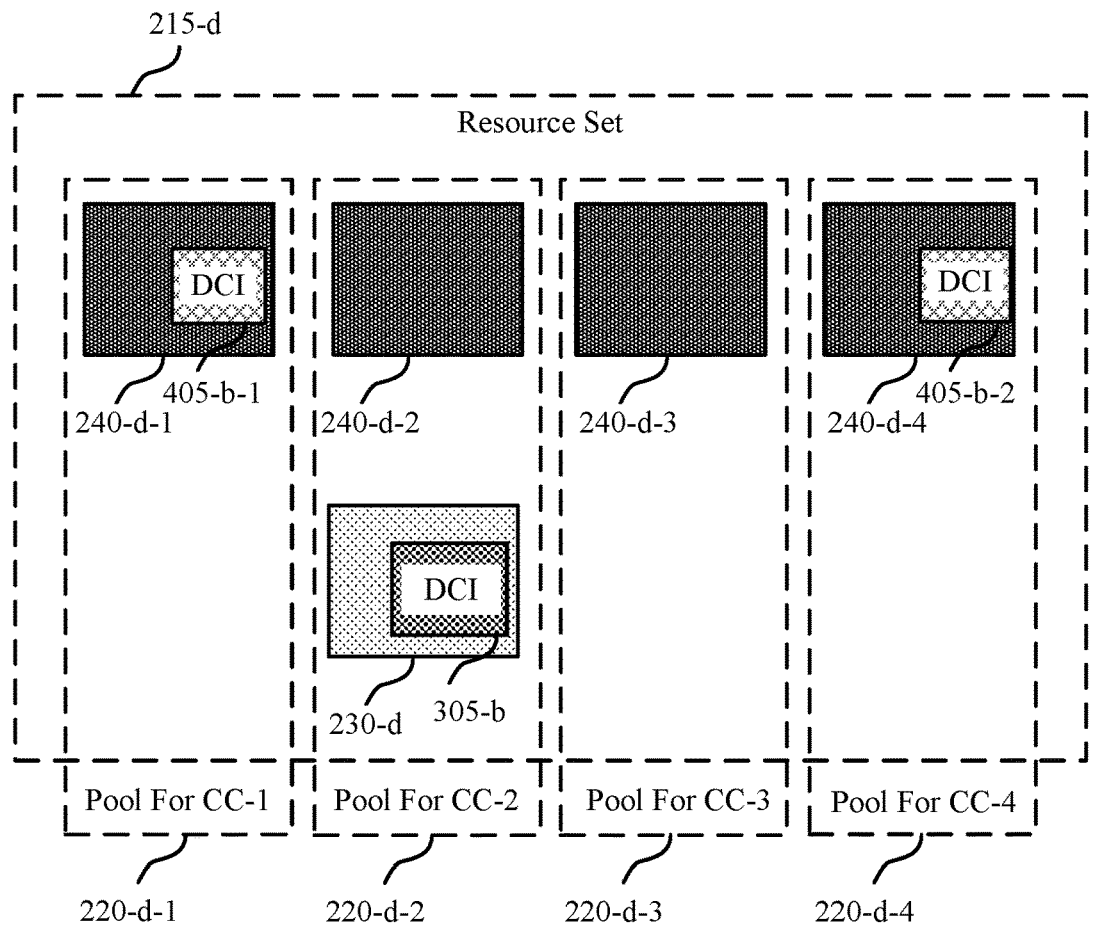
Figure 5:
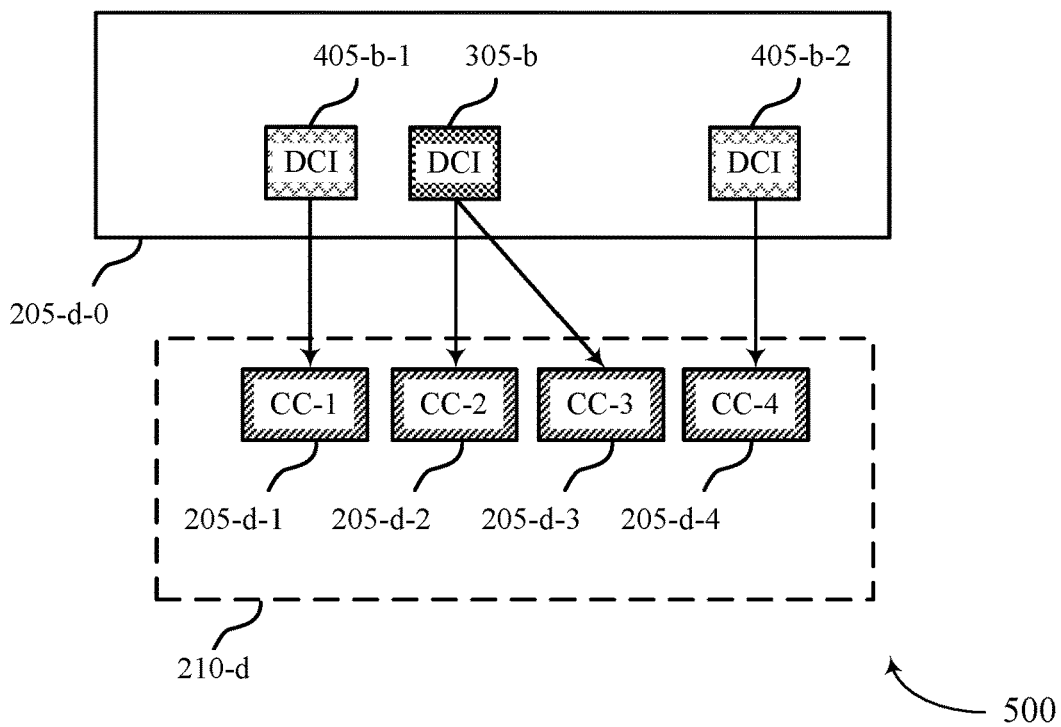

FIG. 5 illustrates an example of a signaling scenario 500 that supports techniques for processing DCI for scheduling multiple cells in accordance with one or more aspects of the present disclosure. The signaling scenario 500 may illustrate an example of implementing aspects of the signaling architecture 200. For example, the signaling scenario 500 illustrates an example for implementing a resource set 215-d (e.g., resources of a scheduling cell 205-d-0, associated with pools 220-d, candidates 230-d, and candidates 240-d) for DCI that schedules communications via one or more cells 205-d of a set 210-d.

In the example of signaling scenario 500, a network entity 105 may output DCI 305-b (e.g., via the scheduling cell 205-d-0, an instance of multi-cell scheduling DCI, such as an instance of DCI format 0_X or 1_X) using resources of the pool 220-d-2 (e.g., a candidate of the candidates 230-d). The DCI 305-b may schedule communications with a UE 115 via the cells 205-d-2 and 205-d-3. The network entity 105 may also output DCI 405-b-1 and DCI 405-b-2 (e.g., via the scheduling cell 205-d-0, instances of single-cell scheduling DCI, such as instances of DCI format 0_0, 0_1, 0_2, 1_0, 1_1, or 1_2, or a combination thereof) using respective resources of pools 220-d (e.g., candidates of candidates 240-d-1 and 240-d-4). The DCI 405-b-1 may schedule communications with a UE 115 via the cell 205-d-1 and the DCI 405-b-2 may schedule communications with a UE 115 via the cell 205-d-4. Accordingly, the UE 115 may communicate via the indicated resources of the cells 205-d-1, 205-d-2, 205-d-3, and 205-d-4 based on receiving the DCI 305-b, the DCI 405-b-1, and the DCI 405-b-2.

To support the reception of the DCI 305-b, the UE 115 may be configured to monitor the pool 220-b-2 (e.g., the candidates 230-b) of the resource set 215-d on the scheduling cell 205-d-0 for a configured quantity of instances multi-cell scheduling DCI (e.g., a configured quantity of instances of multi-cell scheduling DCI for uplink communications, a configured quantity of instances of multi-cell scheduling DCI for downlink communications) directed to the UE 115. If the UE 115 receives the DCI 305-b, the UE 115 may, in some examples, refrain from blindly decoding other candidates of at least the candidates 230-b (e.g., if the DCI 305-b corresponds to the configured quantity of instances to be monitored by the UE 115).

Further, to support the reception of the DCI 405-b, the UE 115 may be configured to monitor each of the pools 220-d (e.g., each of the candidates 240-c) of the resource set 215-d on the scheduling cell 205-d-0 for a configured quantity of instances single-cell scheduling DCI (e.g., a configured quantity of instances of single-cell scheduling DCI for uplink communications, a configured quantity of instances of single-cell scheduling DCI for downlink communications) directed to the UE 115. If the UE 115 receives an instance of DCI 405-b in one of the candidates 240-d, the UE 115 may, in some examples, refrain from blindly decoding other candidates of the one of the candidates 240-d (e.g., if an instance of DCI 405-b corresponds to the configured quantity of instances to be monitored by the UE 115 in candidates 240-c for a given cell 205-c).

Figure 6:
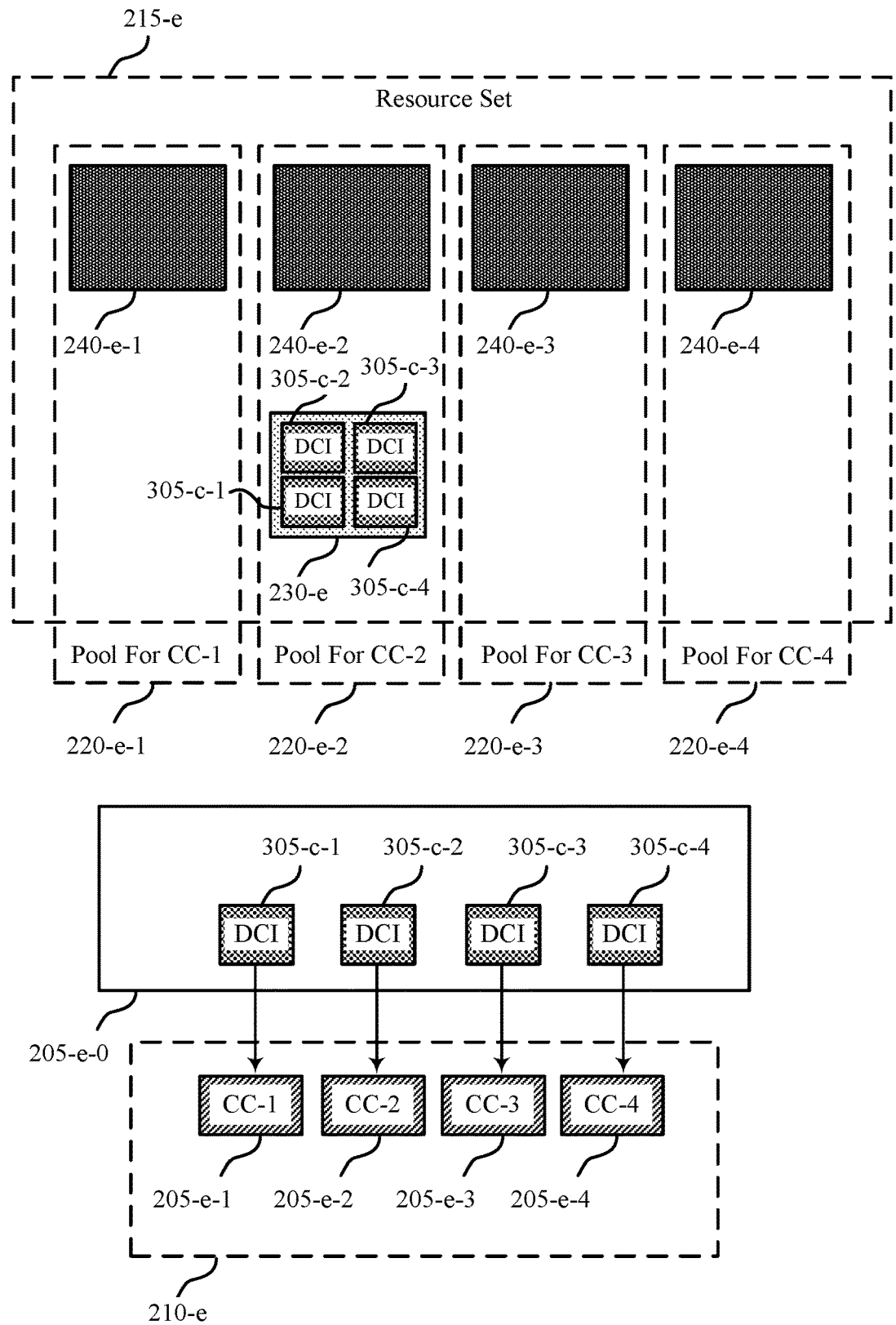

FIG. 6 illustrates an example of a signaling scenario 600 that supports techniques for processing DCI for scheduling multiple cells in accordance with one or more aspects of the present disclosure. The signaling scenario 600 may illustrate an example of implementing aspects of the signaling architecture 200. For example, the signaling scenario 600 illustrates an example for implementing a resource set 215-e (e.g., resources of a scheduling cell 205-e-0, associated with pools 220-e, candidates 230-e, and candidates 240-e) for DCI that schedules communications via one or more cells 205-e of a set 210-e.

In the example of signaling scenario 600, a network entity 105 may output DCI 305-c-1, DCI 305-c-2, DCI 305-c-3, and DCI 305-c-4 (e.g., instances of multi-cell scheduling DCI, such as instances of DCI format 0_X or 1_X) for transmission using respective resources of the pool 220-e-2 (e.g., four candidates of the candidates 230-e). Each instance of DCI 305-c may schedule respective communications with a UE 115 via a respective cell 205-e of the set 210-e. For example, the DCI 305-c-1 may indicate resources of the cell 205-e-1 for uplink communications from the UE 115 (e.g., using DCI format 0_X), or resources of the cell 205-e-1 for downlink communications to the UE 115 (e.g., using DCI format 1_X), and so on. Accordingly, the UE 115 may communicate via the indicated resources of the cells 205-e-1, 205-e-2, 205-e-3, and 205-e-4 based on receiving the DCI 305-c-1, 305-c-2, 305-c-3, and 305-c-4.

To support the reception of the DCI 305-c, the UE 115 may be configured to monitor the pool 220-e-2 (e.g., the candidates 230-e) of the resource set 215-e on the scheduling cell 205-e-0 for a configured quantity of instances multi-cell scheduling DCI (e.g., a configured quantity of instances of multi-cell scheduling DCI for uplink communications, a configured quantity of instances of multi-cell scheduling DCI for downlink communications, at least four instances of DCI) directed to the UE 115. If the UE 115 receives the DCI 305-c-1, 305-c-2, 305-c-3, and 305-c-4, the UE 115 may, in some examples, refrain from blindly decoding other candidates of at least the candidates 230-e (e.g., if the configured quantity of instances to be monitored by the UE 115 is equal to four). In some examples, the UE 115 also may be configured to monitor other candidates (e.g., candidates 240-e) of the resource set 215-e on the scheduling cell 205-e-0 for a configured quantity of instances of single-cell scheduling DCI directed to the UE 115.

Figure 7:
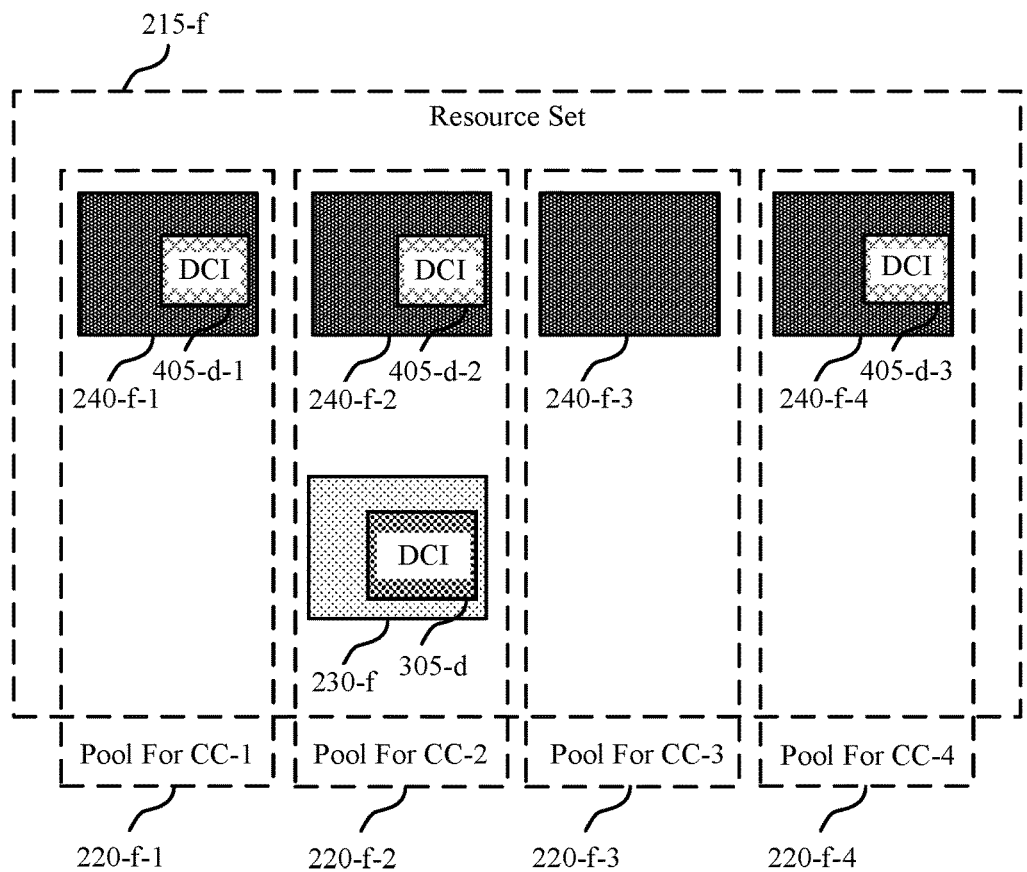
Figure 7:
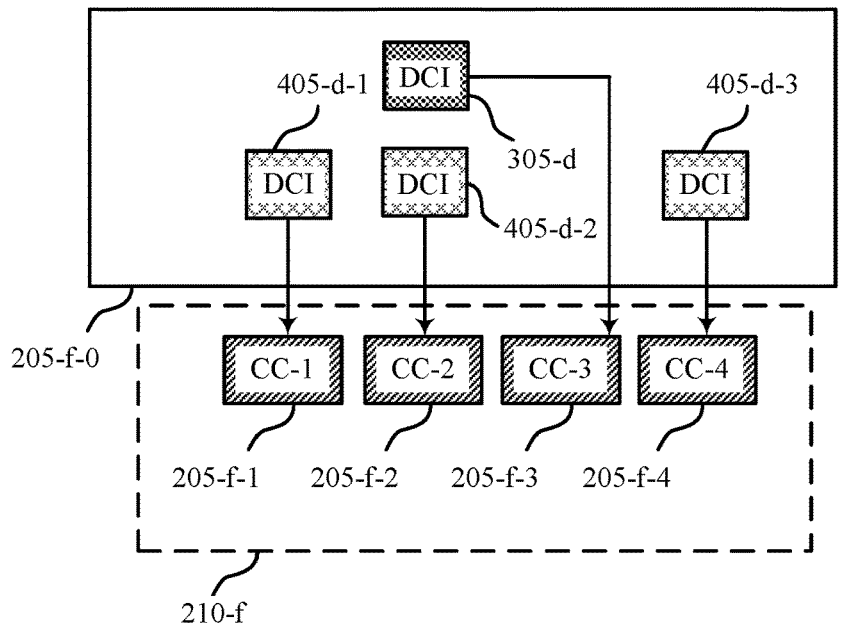

FIG. 7 illustrates an example of a signaling scenario 700 that supports techniques for processing DCI for scheduling multiple cells in accordance with one or more aspects of the present disclosure. The signaling scenario 700 may illustrate an example of implementing aspects of the signaling architecture 200. For example, the signaling scenario 700 illustrates an example for implementing a resource set 215-f (e.g., resources of a scheduling cell 205-f-0, associated with pools 220-f, candidates 230-f, and candidates 240-f) for DCI that schedules communications via one or more cells 205-f of a set 210-f.

In the example of signaling scenario 700, a network entity 105 may output DCI 305-d (e.g., via the scheduling cell 205-f-0, an instance of multi-cell scheduling DCI, such as an instance of DCI format 0_X or 1_X) using resources of the pool 220-f-2 (e.g., a candidate of the candidates 230-f). The DCI 305-d may schedule communications with a UE 115 via the cell 205-f-3. The network entity 105 may also output DCI 405-d-1, 405-d-2, and 405-d-3 using respective resources of pools 220-f (e.g., candidates of respective candidates 240-f). The DCI 405-d-1 may schedule communications with a UE 115 via the cell 205-f-1, the DCI 405-d-2 may schedule communications with a UE 115 via the cell 205-f-2, and the DCI 405-d-3 may schedule communications with a UE 115 via the cell 205-f-4. Accordingly, the UE 115 may communicate via the indicated resources of the cells 205-*f*-1, 205-*f*-2, 205-*f*-3, and 205-*f*-4 based on receiving the DCI 305-*d*, the DCI 405-*d*-1, the DCI 405-*d*-2, and the DCI 405-*d*-3.

To support the reception of the DCI 305-*d*, the UE 115 may be configured to monitor the pool 220-*f*-2 (e.g., the candidates 230-*f*) of the resource set 215-*f* of the scheduling cell 205-*f*-0 for a configured quantity of instances multi-cell scheduling DCI (e.g., a configured quantity of instances of multi-cell scheduling DCI for uplink communications, a configured quantity of instances of multi-cell scheduling DCI for downlink communications) directed to the UE 115. If the UE 115 receives the DCI 305-*d*, the UE 115 may, in some examples, refrain from blindly decoding other candidates of at least the candidates 230-*f* (e.g., if the configured quantity of instances to be monitored by the UE 115 is equal to one).

Further, to support the reception of the DCI 405-*d*, the UE 115 may be configured to monitor each of the pools 220-*f* (e.g., each of the candidates 240-*f*) of the resource set 215-*f* of the scheduling cell 205-*f*-0 for a configured quantity of instances single-cell scheduling DCI (e.g., a configured quantity of instances of single-cell scheduling DCI for uplink communications, a configured quantity of instances of single-cell scheduling DCI for downlink communications) directed to the UE 115. If the UE 115 receives an instance of DCI 405-*d* in one of the candidates 240-*f*, the UE 115 may, in some examples, refrain from blindly decoding other candidates of the one of the candidates 240-*f* (e.g., if a configured quantity of instances to be monitored by the UE 115 in candidates 240-*f* for a given cell 205-*f* is equal to one).

In some examples, a network entity 105 or a UE 115 may be configured to support one or more of the above signaling scenarios, among others. In some examples, a network entity 105 or a UE 115 may be configured to avoid supporting one or more signaling scenarios, which may reduce blind decoding complexity and reduce resource utilization. In some examples, such scenarios may be separately supported for uplink scheduling and downlink scheduling.

A first implementation may be configured at a network entity 105 or a UE 115 to support signaling scenarios 300 or 400 (e.g., either signaling scenario 300 or 400 for uplink scheduling, either signaling scenario 300 or 400 downlink scheduling, or both), and not support signaling scenarios 500, 600, and 700, which may be an example for defining a baseline quantity of unicast scheduling DCIs that a UE 115 is able to process.

For an FDD scheduling cell 205 in accordance with the first implementation, when there is no DCI 305 (e.g., DCI 1_X or 0_X) in a slot of the scheduling cell 205, a UE 115 may be able to process one unicast DCI 405 scheduling downlink per slot of the scheduling cell 205 per scheduled cell 205 (e.g., of a set 210), or one unicast DCI 405 scheduling uplink per slot of the scheduling cell 205 per scheduled cell 205, or both. For a TDD scheduling cell 205 in accordance with the first implementation, when there is no DCI 305 (e.g., 1_X or 0_X) in a slot of a scheduling cell 205, a UE 115 may be able to process one unicast DCI 405 scheduling downlink per slot of the scheduling cell 205 per scheduled cell 205, or two unicast DCI 405 scheduling uplink per slot of the scheduling cell 205 per scheduled cell 205, or both.

Further, for an FDD scheduling cell 205 in accordance with the first implementation, when there is DCI 305 (e.g., 1_X or 0_X) in a slot of a scheduling cell 205, a UE 115 may be able to process one DCI 305 (e.g., of format 1_X) scheduling downlink per slot of the scheduling cell 205 per set 210 (e.g., per set of cells) that can be scheduled by the DCI 305 (e.g., by multi-cell scheduling DCI, by format 1_X) and no unicast DCI 405 (e.g., formats 1_0, 1_1, or 1_2) scheduling downlink for any cell 205 in the set 210, or one DCI 305 (e.g., of format 0_X) scheduling uplink per slot of the scheduling cell 205 per set 210 (e.g., per set of cells) that can be scheduled by the DCI 305 (e.g., by multi-cell scheduling DCI, by format 0_X) and no unicast DCI 405 (e.g., formats 0_0, 0_1, or 0_2) scheduling uplink for any cell 205 in the set 210, or both. For a TDD scheduling cell 205 in accordance with the first implementation, when there is DCI 305 (e.g., 1_X or 0_X) in a slot of a scheduling cell 205, a UE 115 may be able to process one DCI 305 (e.g., of format 1_X) scheduling downlink per slot of the scheduling cell 205 per set 210 (e.g., per set of cells) that can be scheduled by the DCI 305 (e.g., by multi-cell scheduling DCI, by format 1_X) and no unicast DCI 405 (e.g., formats 1_0, 1_1, or 1_2) scheduling downlink for any cell 205 in the set 210, or two DCI 305 (e.g., of format 0_X) scheduling uplink per slot of the scheduling cell 205 per set 210 (e.g., per set of cells) that can be scheduled by the DCI 305 (e.g., by multi-cell scheduling DCI, by format 0_X) and no unicast DCI 405 (e.g., formats 0_0, 0_1, or 0_2) scheduling uplink for any cell 205 in the set 210, or both. In various examples, the techniques described herein for the first implementation may be applied similarly to span-based PDCCH monitoring and CCS with different SCSs.

Thus, in accordance with the first implementation, a network entity 105 may be configured to output either DCI 305, or DCI 405, but not both (e.g., via a scheduling cell 205, for scheduling uplink communications, or downlink communications, respectively) in a monitoring duration, and a UE 115 may be configured to support receiving either DCI 305, or DCI 405, but not both (e.g., for scheduling uplink communications, or downlink communications, respectively) in a monitoring duration. Therefore, in some examples in accordance with the first implementation, a UE 115 may monitor candidates 240 for DCI 405 based on not receiving an instance of DCI 305, or may refrain from monitoring candidates 230 based on receiving an instance of DCI 405. Additionally, or alternatively, in some examples in accordance with the first implementation, a UE 115 may monitor candidates 230 for DCI 305 based on not receiving an instance of DCI 405, or may refrain from monitoring candidates 240 based on receiving an instance of DCI 305. Thus, in accordance with these and other aspects of implementing the first implementation, a network entity 105 and a UE 115 may be configured in a manner that may reduce instances of blind decoding compared with other implementations.

Additionally, or alternatively, a second implementation may be configured at a network entity 105 or a UE 115 to support signaling scenarios 300, 400, or 500 (e.g., either signaling scenario 300, 400, or 500 for uplink scheduling, either signaling scenario 300, 400, or 500 downlink scheduling, or both), and not support signaling scenarios 600 and 700, which may be another example for defining a baseline quantity of unicast scheduling DCIs that a UE 115 is able to process.

For an FDD scheduling cell 205 in accordance with the second implementation, a UE 115 may be able to process one unicast scheduling DCI (e.g., DCI 305 or DCI 405) scheduling downlink per slot of the scheduling cell 205 per scheduled cell 205 where BD or CCE for the unicast scheduling DCI is counted, or one unicast scheduling DCI (e.g., DCI 305 or DCI 405) scheduling uplink per slot of the scheduling cell 205 per scheduled cell 205 where BD or CCE for the unicast scheduling DCI is counted, or both. For a TDD scheduling cell 205 in accordance with the second implementation, a UE 115 may be able to process one unicast scheduling DCI (e.g., DCI 305 or DCI 405) scheduling downlink per slot of the scheduling cell 205 per scheduled cell 205 where BD or CCE for the unicast scheduling DCI is counted, or two unicast scheduling DCI (e.g., DCI 305 or DCI 405) scheduling uplink per slot of the scheduling cell 205 per scheduled cell 205 where BD or CCE for the unicast scheduling DCI is counted, or both.

Thus, in accordance with the second implementation, a network entity 105 may be configured to schedule each cell 205 of a set by DCI 305, or by DCI 405, but not both (e.g., for scheduling uplink communications, or downlink communications, respectively) in a monitoring duration, and a UE 115 may be configured to support receiving either DCI 305, or DCI 405, but not both (e.g., for scheduling uplink communications, or downlink communications, respectively) for scheduling a given cell 205 in a monitoring duration. Therefore, in some examples in accordance with the second implementation, a UE 115 may refrain from monitoring candidates 240 of a scheduled cell 205 during a slot of a scheduling cell 205 based on receiving either DCI 305 or DCI 405 that schedules communications with that same scheduled cell. Thus, in accordance with these and other aspects of implementing the second implementation, a network entity 105 and a UE 115 may be configured in a manner that may reduce instances of blind decoding compared with other implementations.

Additionally, or alternatively, a third implementation may be configured at a network entity 105 or a UE 115 to support signaling scenarios 300, 400, 500, 600, and 700 (e.g., for uplink scheduling, for downlink scheduling, or both), which may be another example for defining a baseline quantity of unicast scheduling DCIs that a UE 115 is able to process.

For an FDD scheduling cell 205 in accordance with the third implementation, a UE 115 may be able to process one unicast scheduling DCI (e.g., DCI 305 or DCI 405) scheduling downlink per slot of the scheduling cell 205 per scheduled cell 205, or one unicast scheduling DCI (e.g., DCI 305 or DCI 405) scheduling uplink per slot of the scheduling cell 205 per scheduled cell 205, or both. For a TDD scheduling cell 205 in accordance with the second implementation, a UE 115 may be able to process one unicast scheduling DCI (e.g., DCI 305 or DCI 405) scheduling downlink per slot of the scheduling cell 205 per scheduled cell 205, or two unicast scheduling DCI (e.g., DCI 305 or DCI 405) scheduling uplink per slot of the scheduling cell 205 per scheduled cell 205, or both.

In some examples, a network entity 105, or a UE 115, or both may be configured (e.g., statically, semi-statically) in an implementation for combinations of multi-cell scheduling DCI and single-cell scheduling DCI, such as the first, second, or third implementation described herein. In some examples, a UE 115 may signal an indication (e.g., a capability indication, a preference indication, a configuration indication) associated with one or more of such implementations. For example, a UE 115 may indicate a capability for the first implementation, or the second implementation, or the third implementation, or a combination thereof. Additionally, or alternatively, a UE 115 may indicate which of such implementations, or combinations of implementations, are enabled for the UE 115.

Figure 8:
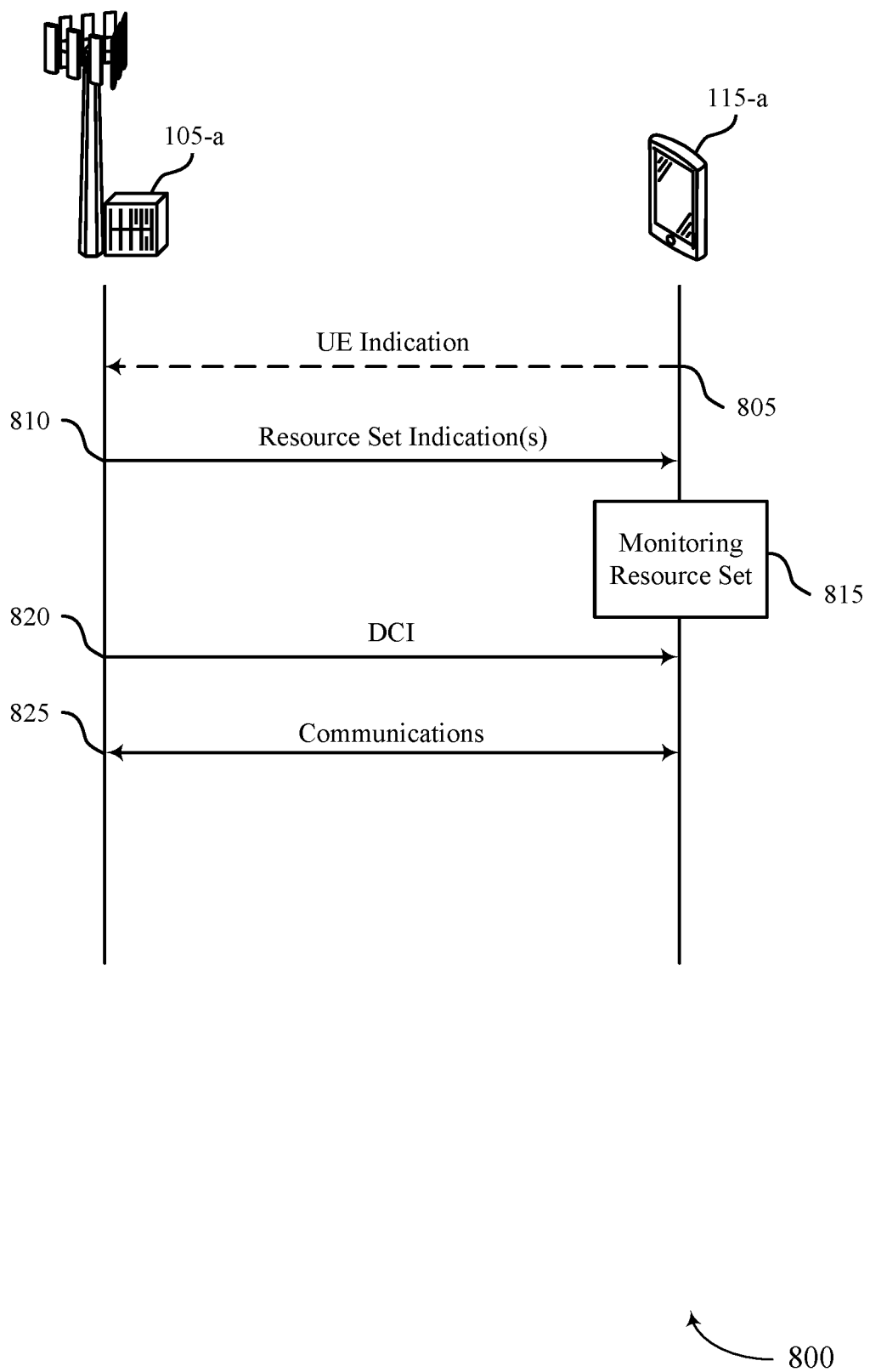
FIG. 8 illustrates an example of a process flow that supports techniques for processing DCI for scheduling multiple cells in accordance with one or more aspects of the present disclosure.

FIG. 8 illustrates an example of a process flow 800 that supports techniques for processing DCI for scheduling multiple cells in accordance with one or more aspects of the present disclosure. In the following description of the process flow 800, the operations between the UE 115-*a* and the network entity 105-*a* may be performed in different orders or at different times. Some operations may also be left out of the process flow 800, or other operations may be added. Although the UE 115-*a* and the network entity 105-*a* are shown performing the operations of the process flow 800, some aspects of some operations may also be performed by one or more other wireless devices. Alternative examples of the following process flow 800 may be implemented, where some steps are performed in a different order than described or are not performed at all. In some cases, steps may include additional features not mentioned below, or further steps may be added.

At 805, in some examples, the UE 115-*a* may transmit an indication (e.g., a capability indication, a configuration indication), which may indicate a capability for multiple-cell scheduling (e.g., a capability for multi-cell scheduling, a capability for supporting the first implementation, or the second implementation, or the third implementation, or a combination thereof), or an indication of which combinations of scheduling DCI (e.g., DCI 305, DCI 405) are enabled at the UE.

At 810, the network entity 105-*a* may transmit one or more indications of a resource set (e.g., a resource set 215) for downlink control signaling, which may be received by the UE 115-*a*. The resource set may include a first set of candidates (e.g., candidates 230) for first DCI (e.g., multi-cell scheduling DCI, DCI 305) that supports scheduling communications with any one or more of a set 210, and multiple second sets of candidates (e.g., candidates 240) for second DCI (e.g., single-cell scheduling DCI, DCI 405) that support scheduling communications with a respective single cell of the set 210. In some examples, one or more of the indications of 810 may be based on an indication of 805. The first set of candidates may be associated with a first set of CCEs during a monitoring duration (e.g., a slot of a scheduling cell 205), and the one or more second sets of candidates may be associated with a respective second set of CCEs during the monitoring duration. An indication of 810 may include an indication that associates the first set of candidates with a pool of downlink control resources of one of the cells of the set of cells. In various examples, an indication of 810 may include an indication of candidates 240 that is communicated via a same cell 205 that is associated with the candidates, or an indication that is communicated via a cell 205 that is not included in a set 210, or an indication that associates candidates 230 with a cell 205, among other indications. In some examples, one or more indications of 810 may be communicated via radio resource control (RRC) signaling At 815, the UE 115-*a* may monitor the resource set (e.g., of the scheduling cell 205) for DCI that schedules communications via one or more cells 205 of the set 210 based on the indications of 810. The monitoring may include monitoring for one or more first DCI formats (e.g., format 0_X, format 1_X, or a combination thereof) in the first set of candidates, or monitoring for one or more second DCI formats (e.g., formats 0_0, 0_1, 0_2, 1_0, 1_1, or 1_2, or a combination thereof) in one or more second sets of candidates, or a combination thereof. In some examples, the monitoring of 815 may include monitoring the resource set for DCI that schedules uplink communications, or schedules downlink communications, or schedules a combination of uplink communications and downlink communications. In some examples, the monitoring of 815 may be performed in accordance with the first implementation, or the second implementation, or the third implementation, among other implementations.

In some examples, the monitoring of 815 may include monitoring the resource set in accordance with a configured first quantity of instances of a first format of the first DCI in the first set of candidates during a slot of a scheduling cell 205, or a configured second quantity of instances of a second format of the second DCI in each second set of candidates during a slot of the scheduling cell 205, but not both the configured first quantity of instances of the first format of the first DCI and the configured second quantity of instances of the second format of the second DCI during the slot of the scheduling cell 205.

In some examples, the monitoring of 815 may include monitoring the resource set in accordance with each cell 205 of the set 210 being operable for scheduling with a configured first quantity of instances of a first format of the first DCI in the first set of candidates during a slot of a scheduling cell 205, or a with a configured second quantity of instances of a second format of the second DCI in each second set of candidates during a slot of a scheduling cell 205, but not both the configured first quantity of instances of the first format of the first DCI and the configured second quantity of instances of the second format of the second DCI during the slot of the scheduling cell 205.

In some examples, the monitoring of 815 may include monitoring the resource set in accordance with a configured first quantity of instances of a first format of the first DCI in the first set of candidates during a slot of a scheduling cell 205, and a configured second quantity of instances of a second format of the second DCI in each second set of candidates during a slot of a scheduling cell 205.

At 820, the network entity 105-*a* may transmit one or more instances of DCI that schedules communications with the UE 115-*a* via one or more cells 205 of the set 210 (e.g., based on transmitting the indications of 810). The DCI of 820 may be received by the UE 115-*a* (e.g., based on the monitoring of 815). In some examples, the DCI of 820 may be transmitted by the network entity 105-*a* in accordance with the first implementation, or the second implementation, or the third implementation, among other implementations.

In some examples, the network entity 105-*a* may transmit one or more instances of a first format of the first DCI in the first set of candidates during a slot of a scheduling cell 205, or one or more instances of a second format of the second DCI in one or more second sets of candidates during the slot of the scheduling cell 205, but not an instance of the first format of the first DCI in the first set of candidates and an instance of the second format of the second DCI in any of the second sets of candidates during the slot of the scheduling cell 205.

In some examples, the network entity 105-*a* may transmit one or more instances of a first format of the first DCI in the first set of candidates during a slot of a scheduling cell 205 to schedule communications via a cell 205 of the set 210, or one or more instances of a second format of the second DCI in the second set of candidates corresponding to the cell 205 during the slot of a scheduling cell 205 to schedule communications via the cell 205, but not an instance of the first format of the first DCI in the first set of candidates and an instance of the second format of the second DCI the second set of candidates during the slot of the scheduling cell 205 to schedule communications via the cell 205.

In some examples, the network entity 105-*a* may transmit one or more instances of a first format of the first DCI in the first set of candidates during a slot of a scheduling cell 205, and one or more instances of a second format of the second DCI in one or more second sets of candidates during the slot of the scheduling cell 205.

At 825, the network entity 105-*a* and the UE 115-*a* may perform communications (e.g., uplink communications, downlink communications, or both) via at least one cell 205 of the set 210 based on the one or more instances of DCI communicated at 820.

Figure 9:
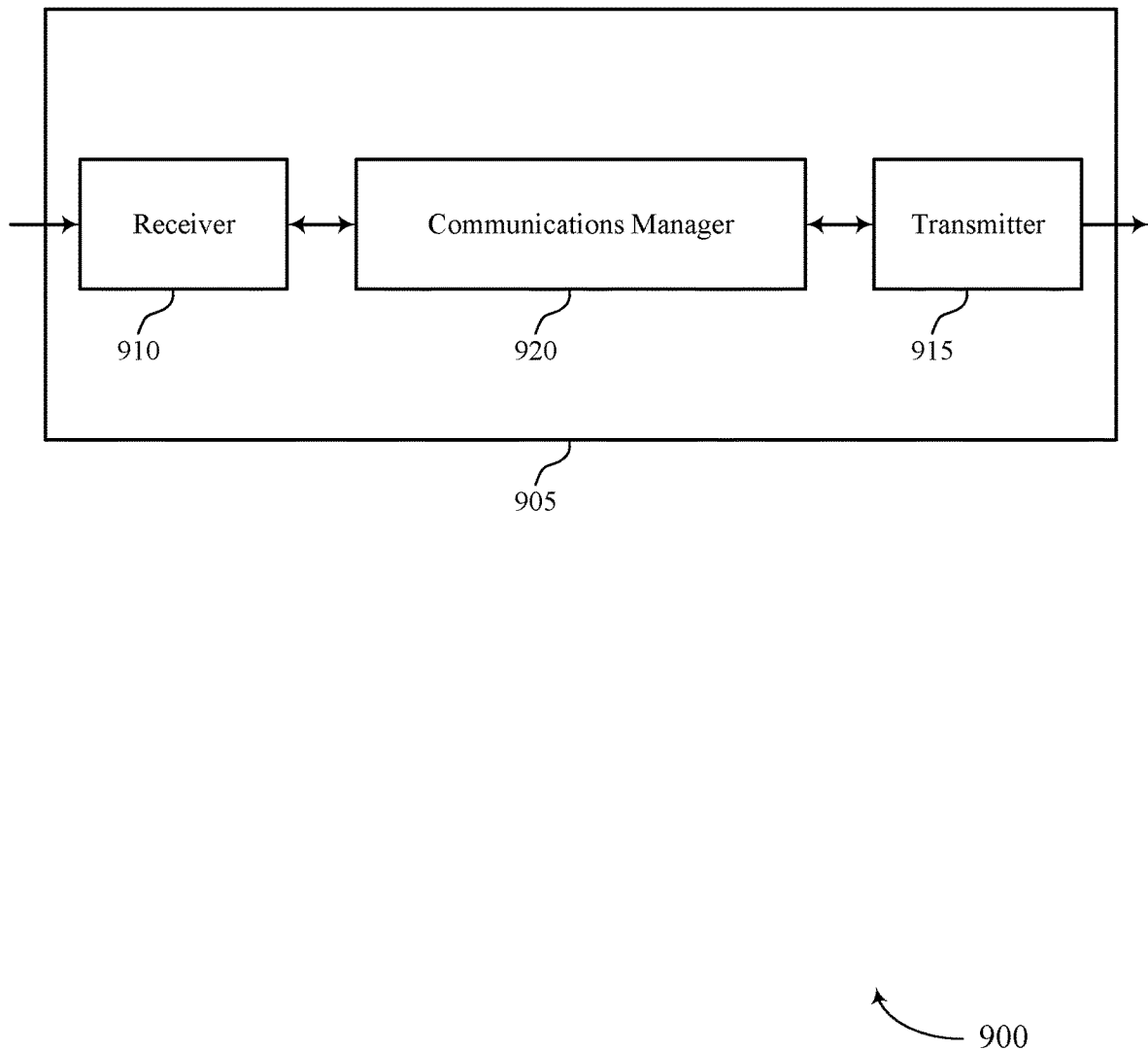
FIGS. 9 and 10 illustrate block diagrams of devices that support techniques for processing DCI for scheduling multiple cells in accordance with one or more aspects of the present disclosure.

FIG. 9 illustrates a block diagram 900 of a device 905 that supports techniques for processing DCI for scheduling multiple cells in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for processing DCI for scheduling multiple cells). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for processing DCI for scheduling multiple cells). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for processing DCI for scheduling multiple cells as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving one or more indications of a resource set for downlink control signaling. The resource set may include a first set of candidates for first DCI that supports scheduling communications with any one or more of a plurality of cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The communications manager 920 also may be configured as or otherwise support a means for monitoring the resource set for DCI that schedules communications via one or more cells of the set of multiple cells based on the one or more indications.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for processing DCI for scheduling multiple cells, which may result in improved communication reliability, reduced latency, improved user experience related to reduced processing, reduced power consumption, more efficient utilization of communication resources, improved coordination between devices, longer battery life, or improved utilization of processing, among other advantages.

Figure 10:
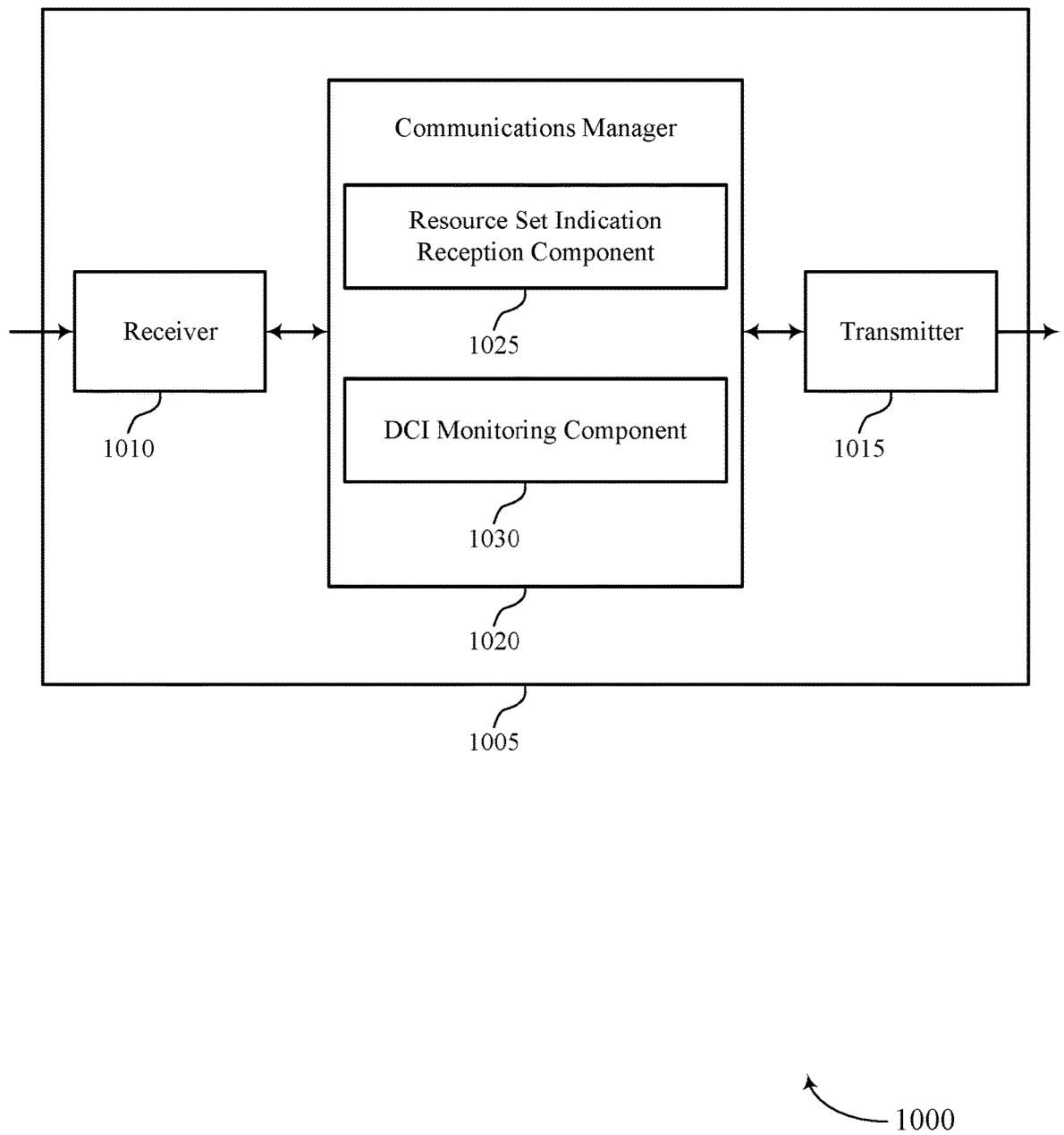

FIG. 10 illustrates a block diagram 1000 of a device 1005 that supports techniques for processing DCI for scheduling multiple cells in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for processing DCI for scheduling multiple cells). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for processing DCI for scheduling multiple cells). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for processing DCI for scheduling multiple cells as described herein. For example, the communications manager 1020 may include a resource set indication reception component 1025 a DCI monitoring component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The resource set indication reception component 1025 may be configured as or otherwise support a means for receiving one or more indications of a resource set for downlink control signaling, the resource set. The resource set may include a first set of candidates for first DCI that supports scheduling communications with any one or more of a plurality of cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The DCI monitoring component 1030 may be configured as or otherwise support a means for monitoring the resource set for DCI that schedules communications via one or more cells of the set of multiple cells based on the one or more indications.

Figure 11:
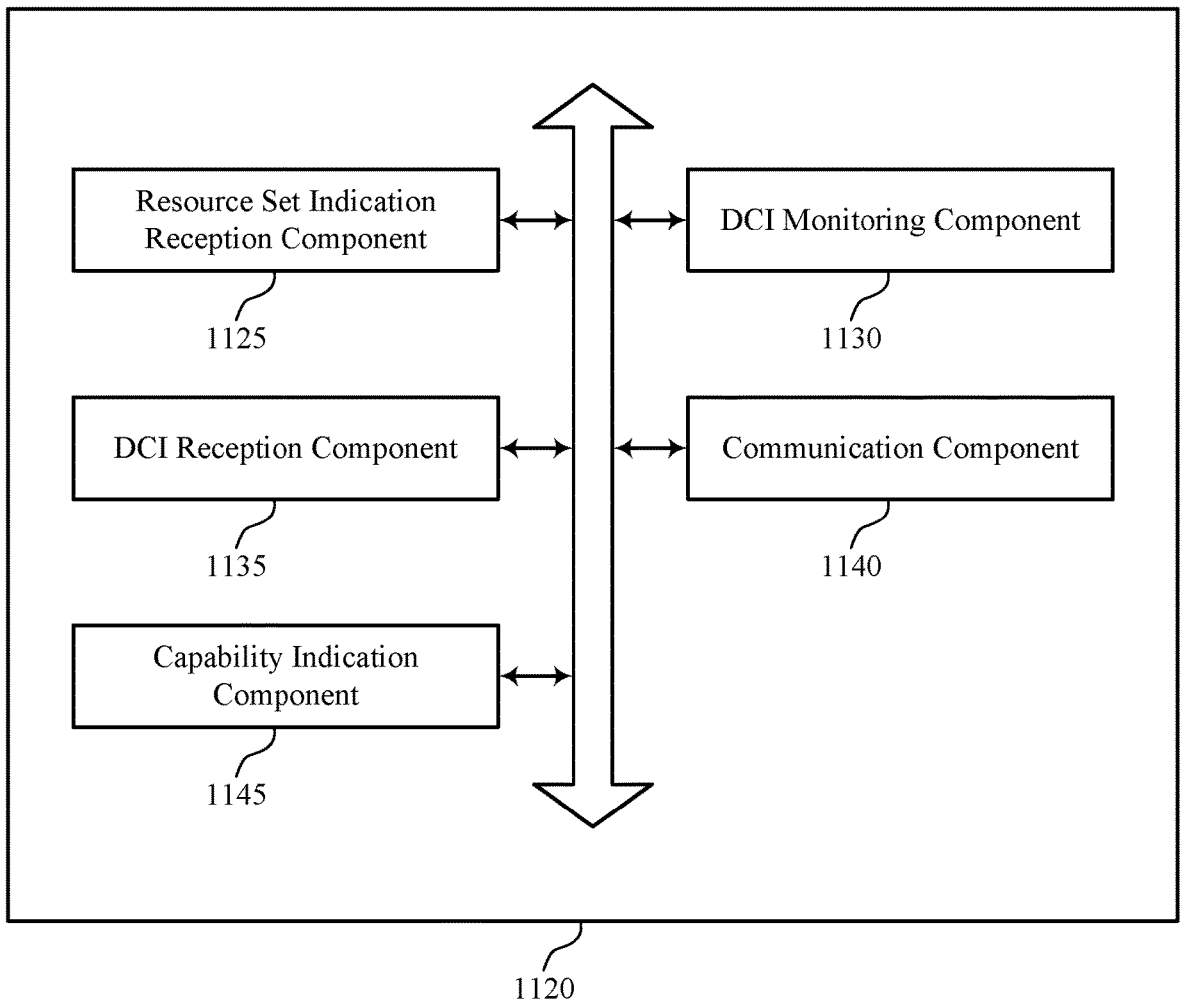
FIG. 11 illustrates a block diagram of a communications manager that supports techniques for processing DCI for scheduling multiple cells in accordance with one or more aspects of the present disclosure.

FIG. 11 illustrates a block diagram 1100 of a communications manager 1120 that supports techniques for processing DCI for scheduling multiple cells in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for processing DCI for scheduling multiple cells as described herein. For example, the communications manager 1120 may include a resource set indication reception component 1125, a DCI monitoring component 1130, a DCI reception component 1135, a communication component 1140, a capability indication component 1145, or any combination thereof. Each of these components may communicate, directly or indirectly, with one another (e.g., via one or more buses).

The communications manager 1120 may support wireless communication at a UE in accordance with examples as disclosed herein. The resource set indication reception component 1125 may be configured as or otherwise support a means for receiving one or more indications of a resource set for downlink control signaling. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The DCI monitoring component 1130 may be configured as or otherwise support a means for monitoring the resource set for DCI that schedules communications via one or more cells of the set of multiple cells based on the one or more indications.

In some examples, the DCI reception component 1135 may be configured as or otherwise support a means for receiving one or more instances of DCI based on the monitoring. In some examples, the communication component 1140 may be configured as or otherwise support a means for communicating (e.g., uplink communications, downlink communications, or both) via at least one cell of the set of multiple cells based on the received one or more instances of DCI.

In some examples, to support monitoring the resource set, the DCI monitoring component 1130 may be configured as or otherwise support a means for monitoring for one or more first DCI formats (e.g., multi-cell scheduling formats) in the first set of candidates, or monitoring for one or more second DCI formats (e.g., single-cell scheduling formats) in one or more second sets of candidates, or a combination thereof.

In some examples, to support monitoring the resource set, the DCI monitoring component 1130 may be configured as or otherwise support a means for monitoring the resource set in accordance with a configured first quantity of instances of a first format of the first DCI in the first set of candidates during a slot of a scheduling cell, or a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

In some examples, to support monitoring the resource set, the DCI monitoring component 1130 may be configured as or otherwise support a means for refraining from monitoring at least a portion of the plurality of second sets of candidates during the slot of the scheduling cell based on receiving an instance of the first format of the first DCI during the slot of a scheduling cell, or refraining from monitoring at least a portion of the first set of candidates during the slot of the scheduling cell based part on receiving an instance of the second format of the second DCI during the slot of a scheduling cell.

In some examples, to support monitoring the resource set, the DCI monitoring component 1130 may be configured as or otherwise support a means for monitoring the resource set in accordance with each cell of the plurality of cells being operable for scheduling with a configured first quantity of instances of a first format of the first DCI in the first set of candidates during a slot of a scheduling cell, or a with a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

In some examples, to support monitoring the resource set, the DCI monitoring component 1130 may be configured as or otherwise support a means for refraining from monitoring at least a portion of the plurality of second sets of candidates, corresponding to one or more of the plurality of cells, during the slot of the scheduling cell based at least in part on receiving an instance of the first format of the first downlink information during the slot of a scheduling cell associated with scheduling communications of the one or more of the plurality of cells.

In some examples, to support monitoring the resource set, the DCI monitoring component 1130 may be configured as or otherwise support a means for monitoring the resource set in accordance with a configured first quantity of instances of a first format of the first DCI in the first set of candidates during a slot of a scheduling cell, and a configured second quantity of instances of a second format of the second DCI in each second set of candidates during a slot of a scheduling cell.

In some examples, the capability indication component 1145 may be configured as or otherwise support a means for transmitting an indication of a capability (e.g., for multiple-cell scheduling, for multi-cell scheduling), and receiving at least one of the one or more indications of the resource set for downlink control signaling may be based on transmitting the indication of the capability.

In some examples, to support receiving the one or more indications of the resource set, the resource set indication reception component 1125 may be configured as or otherwise support a means for receiving an indication that associates the first set of candidates with a pool of downlink control resources of one of the cells of the set of multiple cells.

In some examples, to support receiving the one or more indications of the resource set, the resource set indication reception component 1125 may be configured as or otherwise support a means for receiving a respective indication of at least one second set of candidates via the respective cell.

In some examples, to support receiving the one or more indications of the resource set, the resource set indication reception component 1125 may be configured as or otherwise support a means for receiving at least one indication of the resource set via a cell not included in the set of multiple cells.

In some examples, to support receiving the one or more indications of the resource set, the resource set indication reception component 1125 may be configured as or otherwise support a means for receiving at least one indication of the resource set via RRC signaling.

In some examples, the first set of candidates is associated with a first set of CCEs during a monitoring duration (e.g., a slot of a scheduling cell), and one or more second sets of candidates (e.g., each second set of candidates) is associated with a respective second set of CCEs during the monitoring duration.

In some examples, to support monitoring the resource set, the DCI monitoring component 1130 may be configured as or otherwise support a means for monitoring the resource set for DCI that schedules uplink communications, or schedules downlink communications, or schedules a combination of uplink communications and downlink communications based on the one or more indications.

Figure 12:
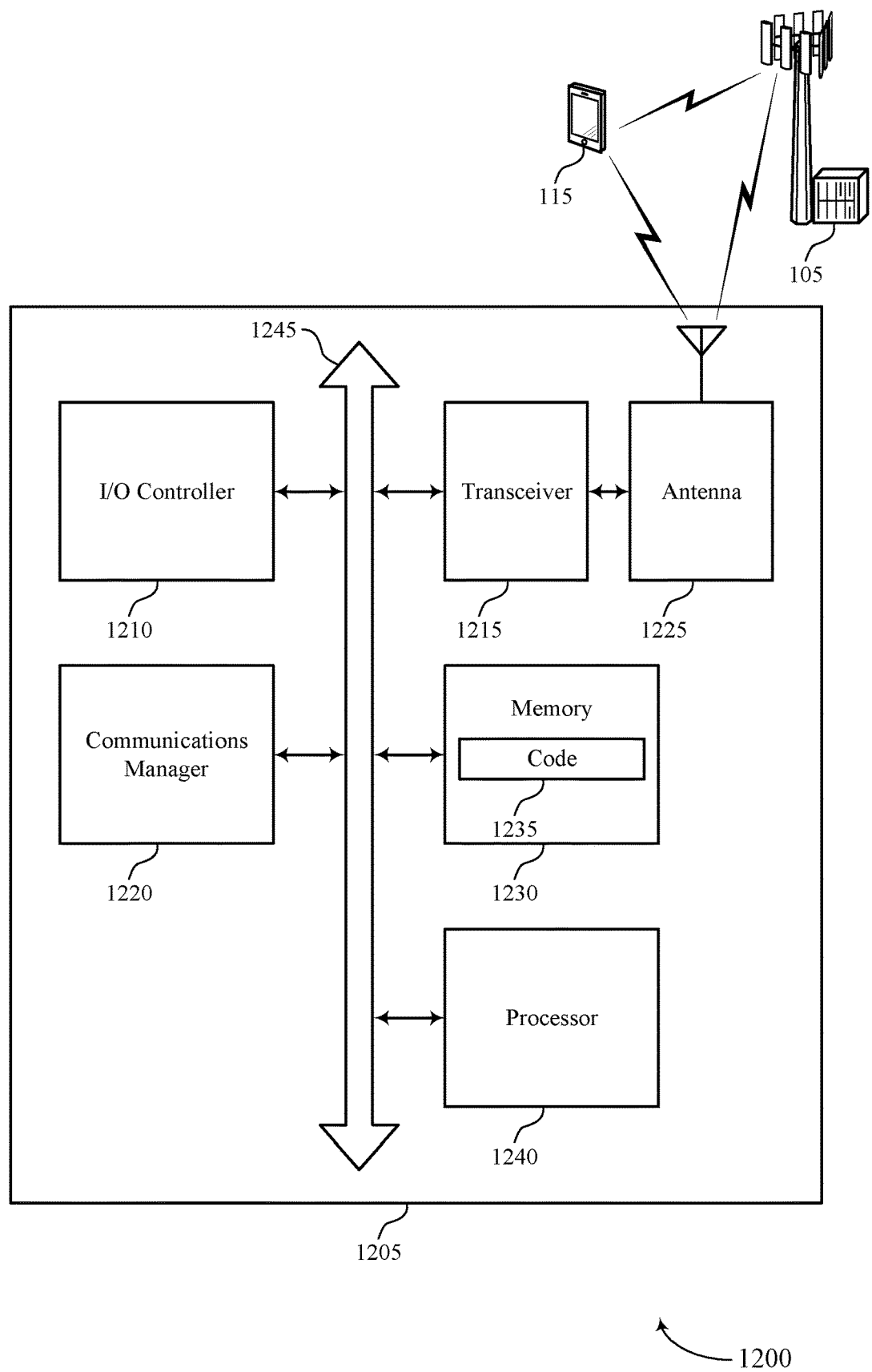
FIG. 12 illustrates a diagram of a system including a device that supports techniques for processing DCI for scheduling multiple cells in accordance with one or more aspects of the present disclosure.

FIG. 12 illustrates a diagram of a system 1200 including a device 1205 that supports techniques for processing DCI for scheduling multiple cells in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for processing DCI for scheduling multiple cells). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving one or more indications of a resource set for downlink control signaling, the resource set. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The communications manager 1220 may be configured as or otherwise support a means for monitoring the resource set for DCI that schedules communications via one or more cells of the set of multiple cells based on the one or more indications.

By including or configuring the communications manager 1220 in accordance with examples as described herein, the device 1205 may support techniques for processing DCI for scheduling multiple cells, which may result in improved communication reliability, reduced latency, improved user experience related to reduced processing, reduced power consumption, more efficient utilization of communication resources, improved coordination between devices, longer battery life, or improved utilization of processing, among other advantages.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for processing DCI for scheduling multiple cells as described herein, or the processor 1240 and the memory 1230 may be otherwise configured to perform or support such operations.

Figure 13:
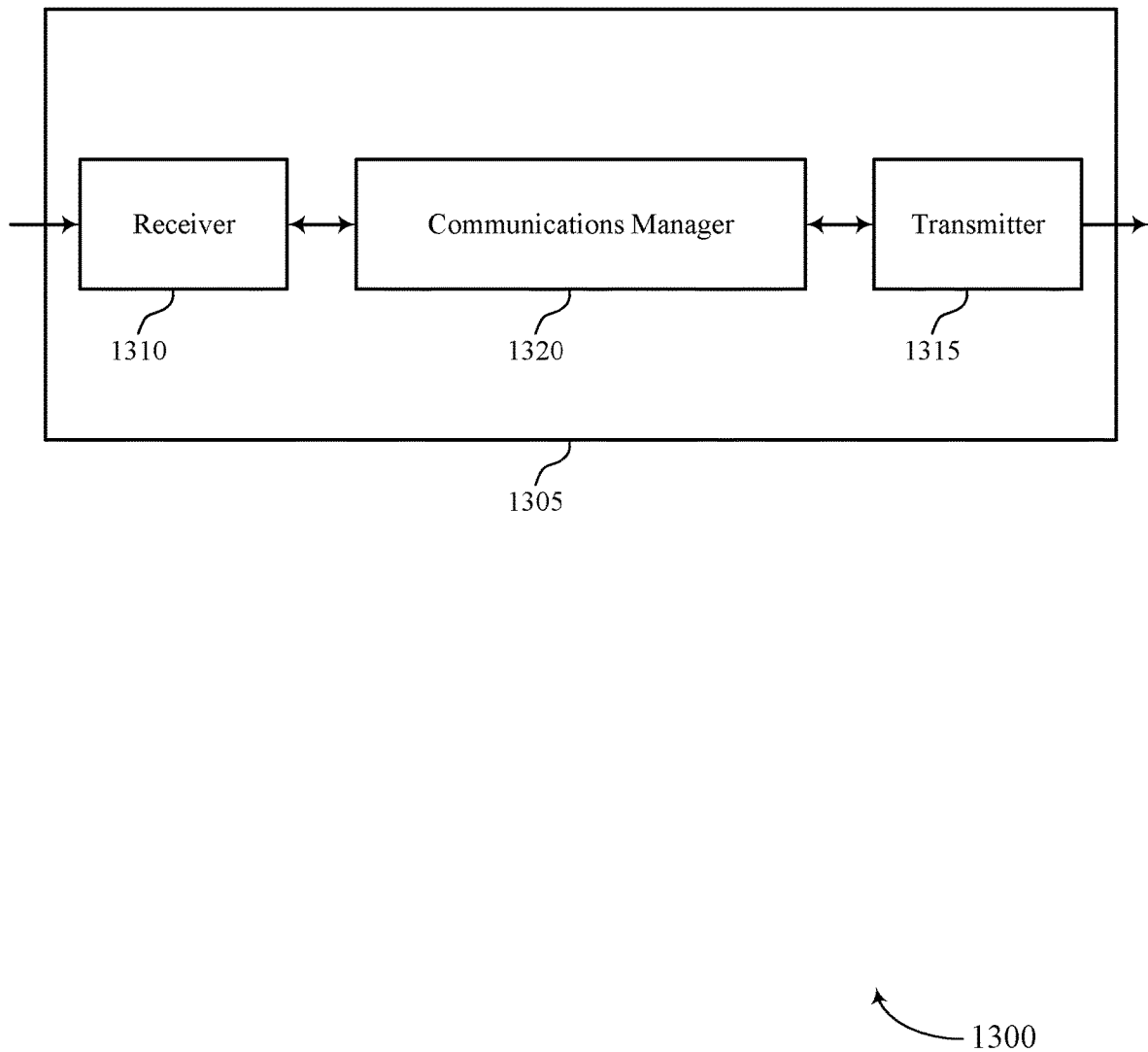
FIGS. 13 and 14 illustrate block diagrams of devices that support techniques for processing DCI for scheduling multiple cells in accordance with one or more aspects of the present disclosure.

FIG. 13 illustrates a block diagram 1300 of a device 1305 that supports techniques for processing DCI for scheduling multiple cells in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for processing DCI for scheduling multiple cells as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. For example, the communications manager 1320 may be configured as or otherwise support a means for outputting one or more indications of a resource set for downlink control signaling. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The communications manager 1320 may be configured as or otherwise support a means for outputting, based at least in part on outputting the one or more indications, one or more instances of DCI that schedules communications with a UE via one or more cells of the set of multiple cells. The communications manager 1320 may be configured as or otherwise support a means for communicating with the UE via at least one cell of the set of multiple cells based on outputting the one or more instances of DCI.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for processing DCI for scheduling multiple cells, which may result in improved communication reliability, reduced latency, improved user experience related to reduced processing, reduced power consumption, more efficient utilization of communication resources, improved coordination between devices, longer battery life, or improved utilization of processing, among other advantages.

Figure 14:
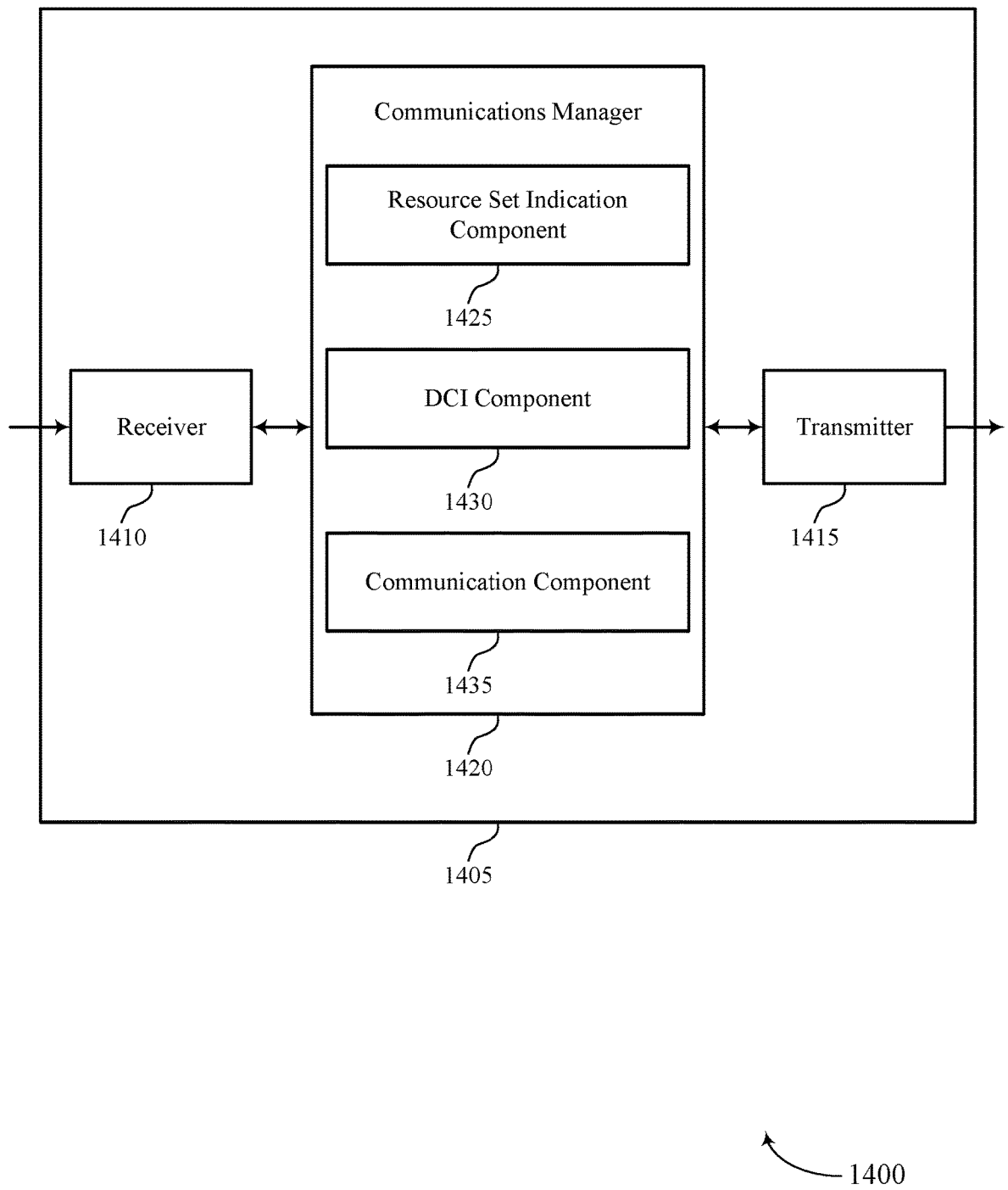

FIG. 14 illustrates a block diagram 1400 of a device 1405 that supports techniques for processing DCI for scheduling multiple cells in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for processing DCI for scheduling multiple cells as described herein. For example, the communications manager 1420 may include a resource set indication component 1425, a DCI component 1430, a communication component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. The resource set indication component 1425 may be configured as or otherwise support a means for outputting one or more indications of a resource set for downlink control signaling. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The DCI component 1430 may be configured as or otherwise support a means for outputting, based on outputting the one or more indications, one or more instances of DCI that schedules communications with a UE via one or more cells of the set of multiple cells. The communication component 1435 may be configured as or otherwise support a means for communicating with the UE via at least one cell of the set of multiple cells based on outputting the one or more instances of DCI.

Figure 15:
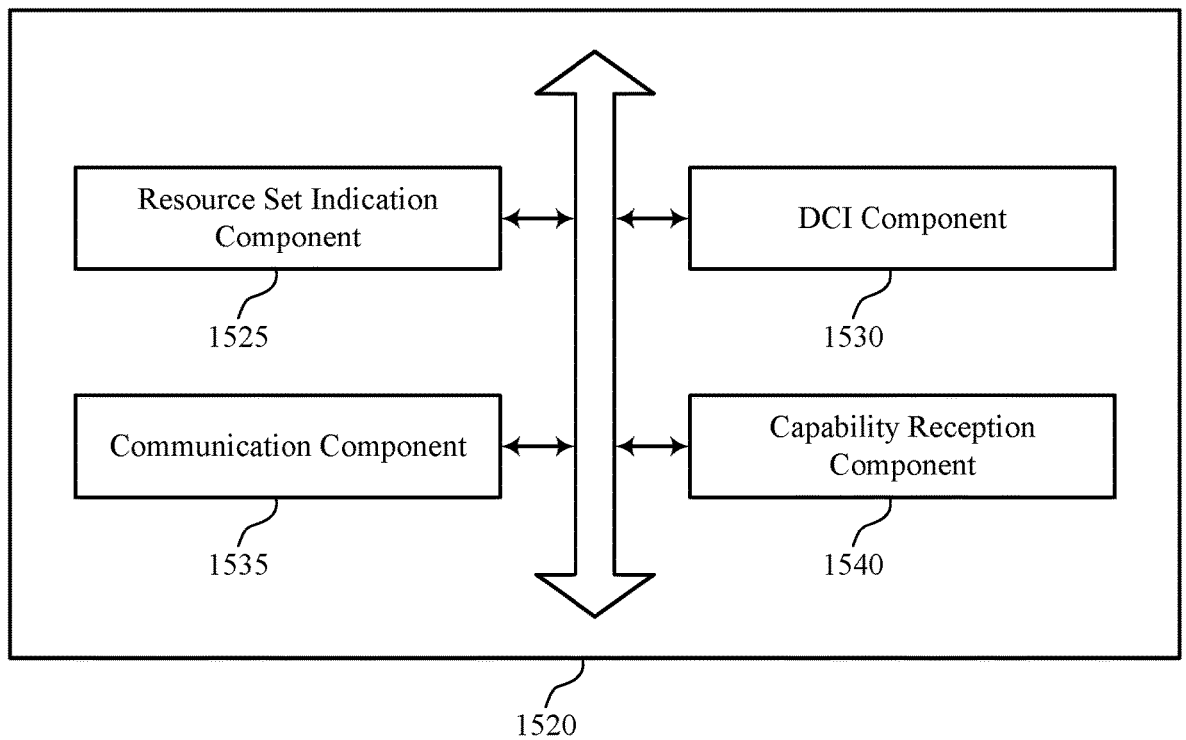
FIG. 15 illustrates a block diagram of a communications manager that supports techniques for processing DCI for scheduling multiple cells in accordance with one or more aspects of the present disclosure.

FIG. 15 illustrates a block diagram 1500 of a communications manager 1520 that supports techniques for processing DCI for scheduling multiple cells in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for processing DCI for scheduling multiple cells as described herein. For example, the communications manager 1520 may include a resource set indication component 1525, a DCI component 1530, a communication component 1535, a capability reception component 1540, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The resource set indication component 1525 may be configured as or otherwise support a means for outputting one or more indications of a resource set for downlink control signaling. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The DCI component 1530 may be configured as or otherwise support a means for outputting, based on outputting the one or more indications, one or more instances of DCI that schedules communications with a UE via one or more cells of the set of multiple cells. The communication component 1535 may be configured as or otherwise support a means for communicating with the UE via at least one cell of the set of multiple cells based on outputting the one or more instances of DCI.

In some examples, to support outputting the one or more instances of DCI, the DCI component 1530 may be configured as or otherwise support a means for outputting one or more first DCI formats in the first set of candidates, or outputting one or more second DCI formats in one or more second sets of candidates, or a combination thereof.

In some examples, to support outputting the one or more instances of DCI, the DCI component 1530 may be configured as or otherwise support a means for outputting one or more instances of a first format of the first DCI in the first set of candidates during a slot of a scheduling cell, or one or more instances of a second format of the second DCI in one or more second sets of candidates during the slot of the scheduling cell, but not an instance of the first format of the first DCI in the first set of candidates and an instance of the second format of the second DCI in any of the second sets of candidates during the slot of the scheduling cell.

In some examples, to support outputting the one or more instances of DCI, the DCI component 1530 may be configured as or otherwise support a means for outputting one or more instances of a first format of the first DCI in the first set of candidates during a slot of a scheduling cell to schedule communications via a cell of the plurality of cells, or one or more instances of a second format of the second DCI in the second set of candidates corresponding to the cell during the slot of a scheduling cell to schedule communications via the cell, but not an instance of the first format of the first DCI in the first set of candidates and an instance of the second format of the second DCI the second set of candidates during the slot of the scheduling cell to schedule communications via the cell.

In some examples, to support outputting the one or more instances of DCI, the DCI component 1530 may be configured as or otherwise support a means for outputting one or more instances of a first format of the first DCI in the first set of candidates during a slot of a scheduling cell, and one or more instances of a second format of the second DCI in one or more second sets of candidates during the slot of the scheduling cell.

In some examples, the capability reception component 1540 may be configured as or otherwise support a means for obtaining an indication of a capability of the UE (e.g., for multiple-cell scheduling, for multi-cell scheduling) where outputting at least one of the one or more indications of the resource set for downlink control signaling is based on obtaining the indication of the capability.

In some examples, to support outputting the one or more indications of the resource set, the resource set indication component 1525 may be configured as or otherwise support a means for outputting an indication that associates the first set of candidates with a pool of downlink control resources of one of the cells of the set of multiple cells.

In some examples, to support outputting the one or more indications of the resource set, the resource set indication component 1525 may be configured as or otherwise support a means for outputting a respective indication of at least one second set of candidates via the respective cell.

In some examples, to support outputting the one or more indications of the resource set, the resource set indication component 1525 may be configured as or otherwise support a means for outputting at least one indication of the resource set via a cell not included in the set of multiple cells.

In some examples, to support outputting the one or more indications of the resource set, the resource set indication component 1525 may be configured as or otherwise support a means for outputting at least one indication of the resource set via RRC signaling.

In some examples, the first the first set of candidates is associated with a first set of CCEs during a monitoring duration (e.g., a slot of a scheduling cell), and one or more second sets of candidates (e.g., each second set of candidates) is associated with a respective second set of CCEs during the monitoring duration.

In some examples, to support outputting the one or more instances of DCI, the DCI component 1530 may be configured as or otherwise support a means for outputting at least one instance of DCI that schedules uplink communications, or that schedules downlink communications, or that schedules a combination of uplink communications and downlink communications.

Figure 16:
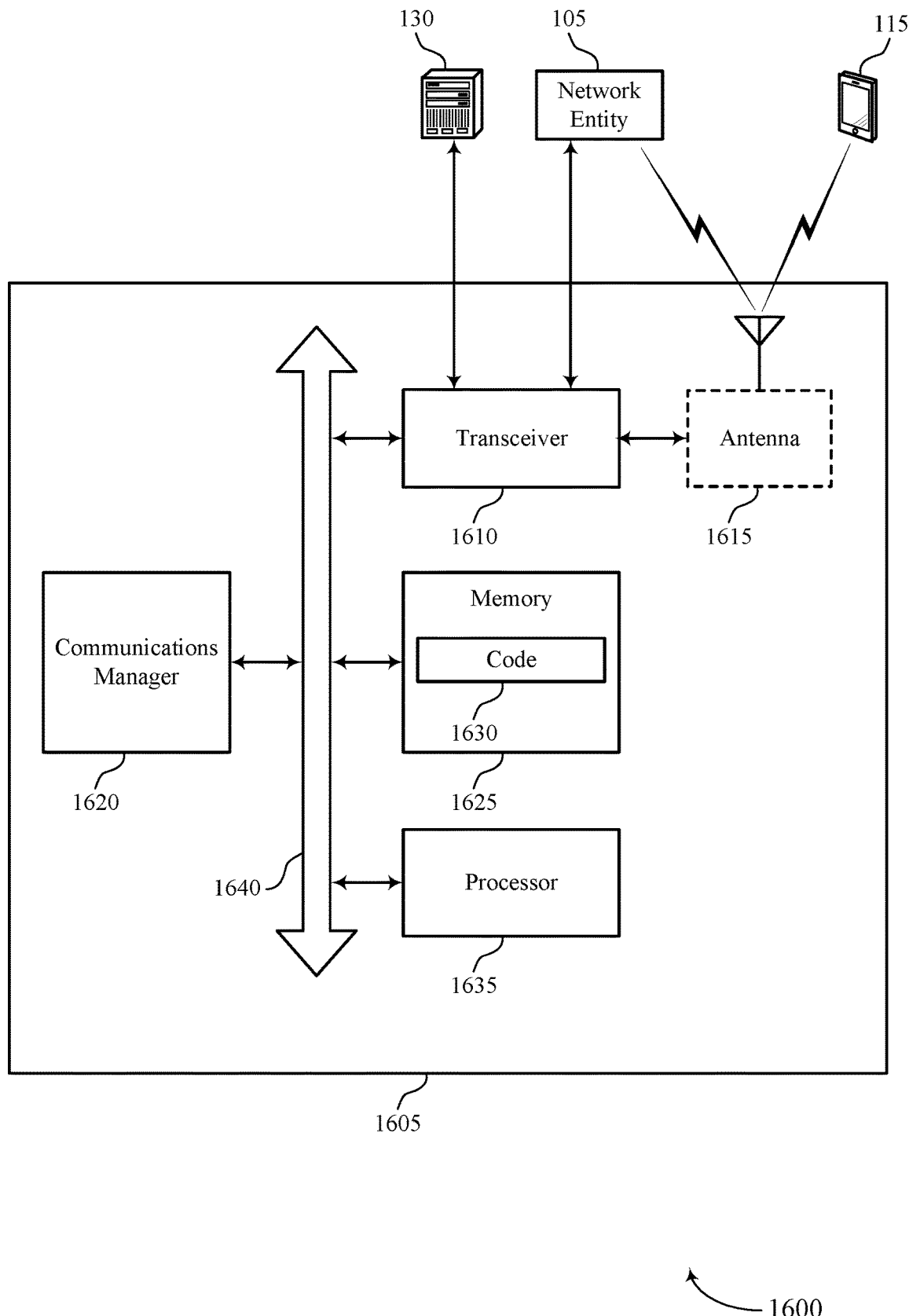
FIG. 16 illustrates a diagram of a system including a device that supports techniques for processing DCI for scheduling multiple cells in accordance with one or more aspects of the present disclosure.

FIG. 16 illustrates a diagram of a system 1600 including a device 1605 that supports techniques for processing DCI for scheduling multiple cells in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting techniques for processing DCI for scheduling multiple cells). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for outputting one or more indications of a resource set for downlink control signaling. The resource set may include a first set of candidates for first DCI that supports scheduling communications with any one or more of a set of multiple cells (e.g., multi-cell scheduling), and a plurality of second sets of candidates, one or more of the second sets of candidates (e.g., each second set of candidates) for second DCI that supports scheduling communications with a respective single cell of the plurality of cells (e.g., single-cell scheduling). The communications manager 1620 may be configured as or otherwise support a means for outputting, based at least in part on outputting the one or more indications, one or more instances of DCI that schedules communications with a UE via one or more cells of the set of multiple cells. The communications manager 1620 may be configured as or otherwise support a means for communicating with the UE via at least one cell of the set of multiple cells based on outputting the one or more instances of DCI.

By including or configuring the communications manager 1620 in accordance with examples as described herein, the device 1605 may support techniques for processing DCI for scheduling multiple cells, which may result in improved communication reliability, reduced latency, improved user experience related to reduced processing, reduced power consumption, more efficient utilization of communication resources, improved coordination between devices, longer battery life, or improved utilization of processing, among other advantages.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of techniques for processing DCI for scheduling multiple cells as described herein, or the processor 1635 and the memory 1625 may be otherwise configured to perform or support such operations.

Figure 17:
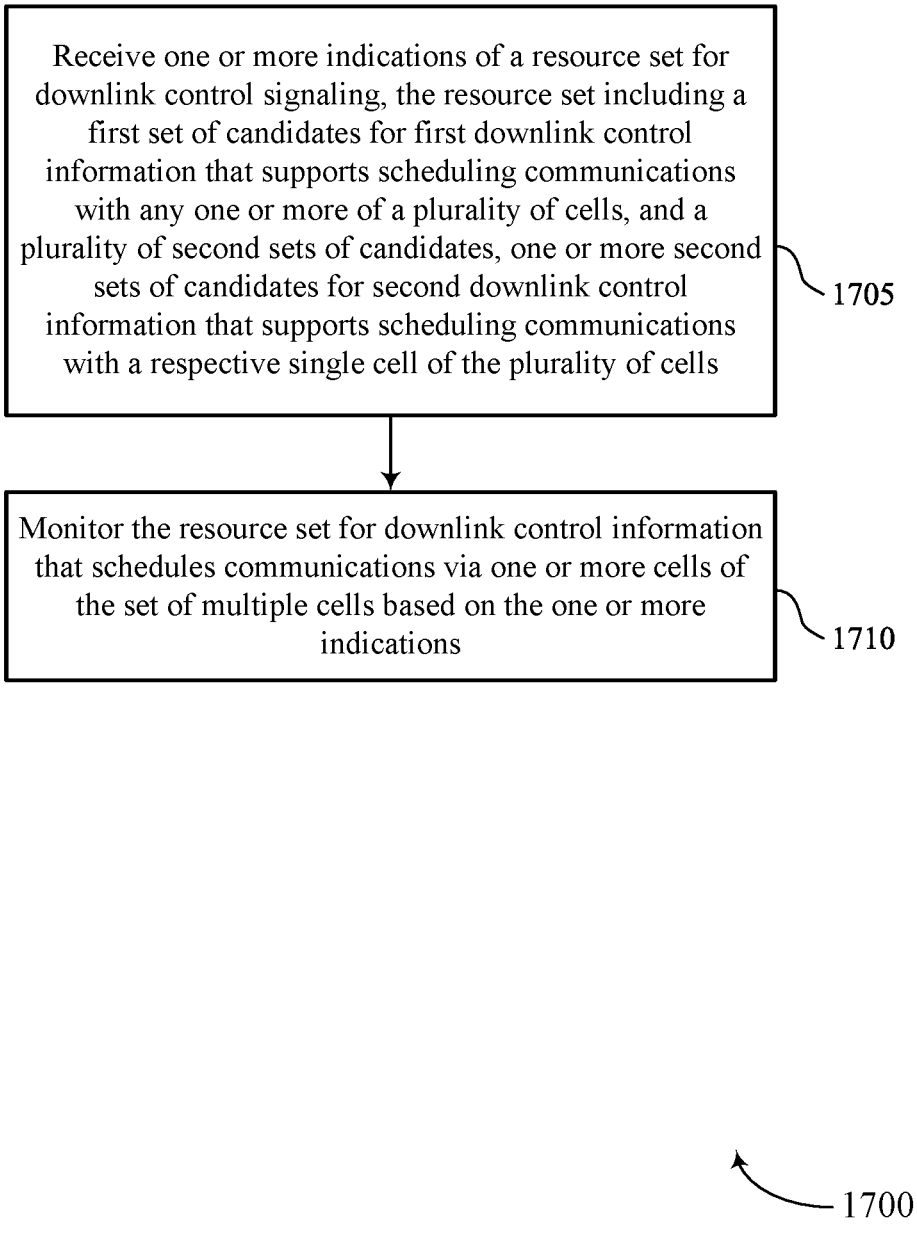
FIGS. 17 through 20 illustrate flowcharts showing methods that support techniques for processing DCI for scheduling multiple cells in accordance with one or more aspects of the present disclosure.

FIG. 17 illustrates a flowchart showing a method 1700 that supports techniques for processing DCI for scheduling multiple cells in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving one or more indications of a resource set for downlink control signaling, the resource set including a first set of candidates for first DCI that supports scheduling communications with any one or more of a plurality of cells, and a plurality of second sets of candidates, one or more second sets of candidates for second DCI that supports scheduling communications with a respective single cell of the plurality of cells. The operations of 1705 may be performed in accordance with examples as disclosed herein. In some examples, aspects of the operations of 1705 may be performed by a resource set indication reception component 1125 as described with reference to FIG. 11.

At 1710, the method may include monitoring the resource set for DCI that schedules communications via one or more cells of the set of multiple cells based on the one or more indications. The operations of 1710 may be performed in accordance with examples as disclosed herein. In some examples, aspects of the operations of 1710 may be performed by a DCI monitoring component 1130 as described with reference to FIG. 11.

Figure 18:
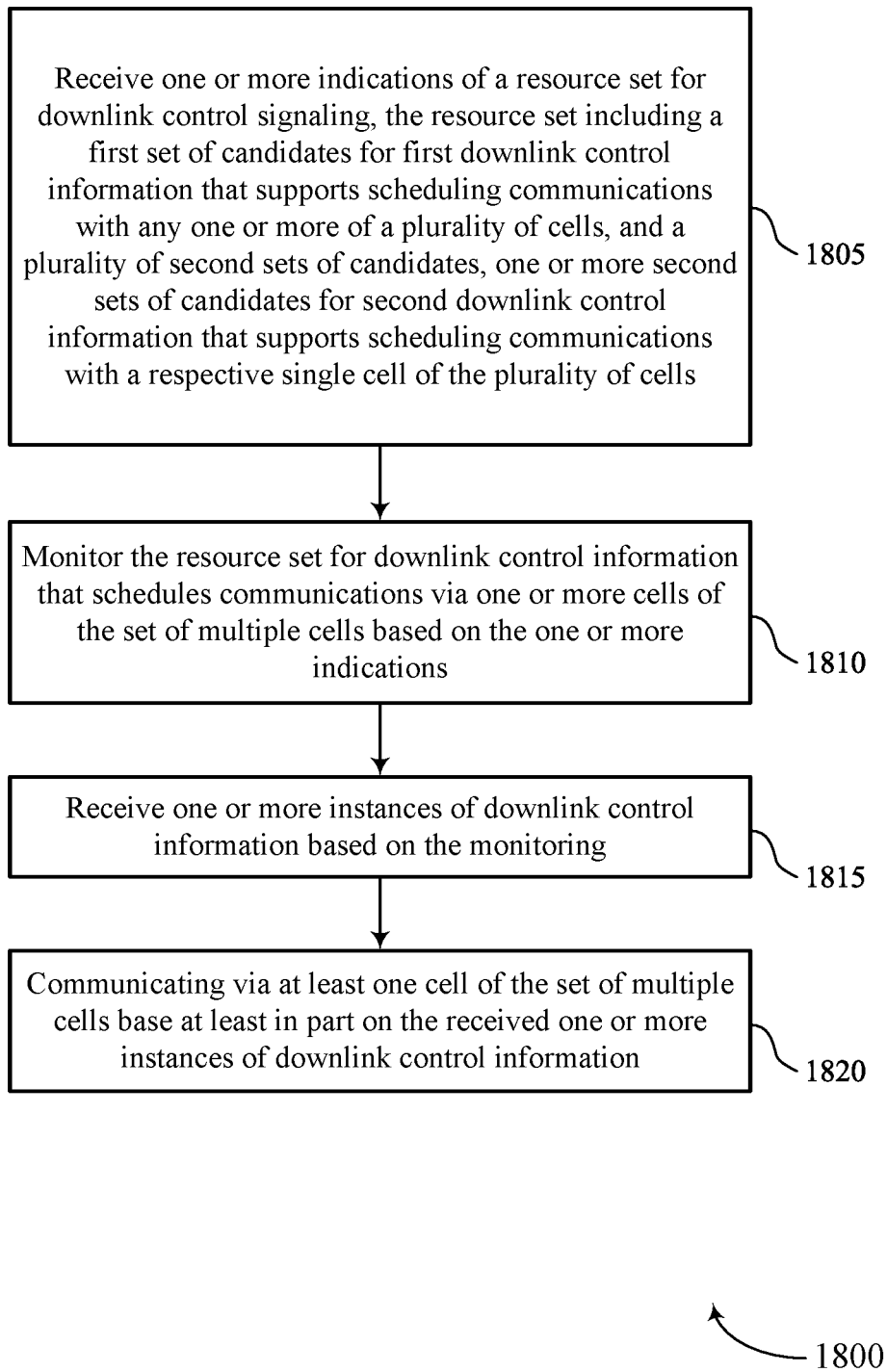

FIG. 18 illustrates a flowchart showing a method 1800 that supports techniques for processing DCI for scheduling multiple cells in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving one or more indications of a resource set for downlink control signaling, the resource set including a first set of candidates for first DCI that supports scheduling communications with any one or more of a plurality of cells, and a plurality of second sets of candidates, one or more second sets of candidates for second DCI that supports scheduling communications with a respective single cell of the plurality of cells. The operations of 1805 may be performed in accordance with examples as disclosed herein. In some examples, aspects of the operations of 1805 may be performed by a resource set indication reception component 1125 as described with reference to FIG. 11.

At 1810, the method may include monitoring the resource set for DCI that schedules communications via one or more cells of the set of multiple cells based on the one or more indications. The operations of 1810 may be performed in accordance with examples as disclosed herein. In some examples, aspects of the operations of 1810 may be performed by a DCI monitoring component 1130 as described with reference to FIG. 11.

At 1815, the method may include receiving one or more instances of DCI based on the monitoring. The operations of 1815 may be performed in accordance with examples as disclosed herein. In some examples, aspects of the operations of 1815 may be performed by a DCI reception component 1135 as described with reference to FIG. 11.

At 1820, the method may include communicating via at least one cell of the set of multiple cells based on the received one or more instances of DCI. The operations of 1820 may be performed in accordance with examples as disclosed herein. In some examples, aspects of the operations of 1820 may be performed by a communication component 1140 as described with reference to FIG. 11.

Figure 19:
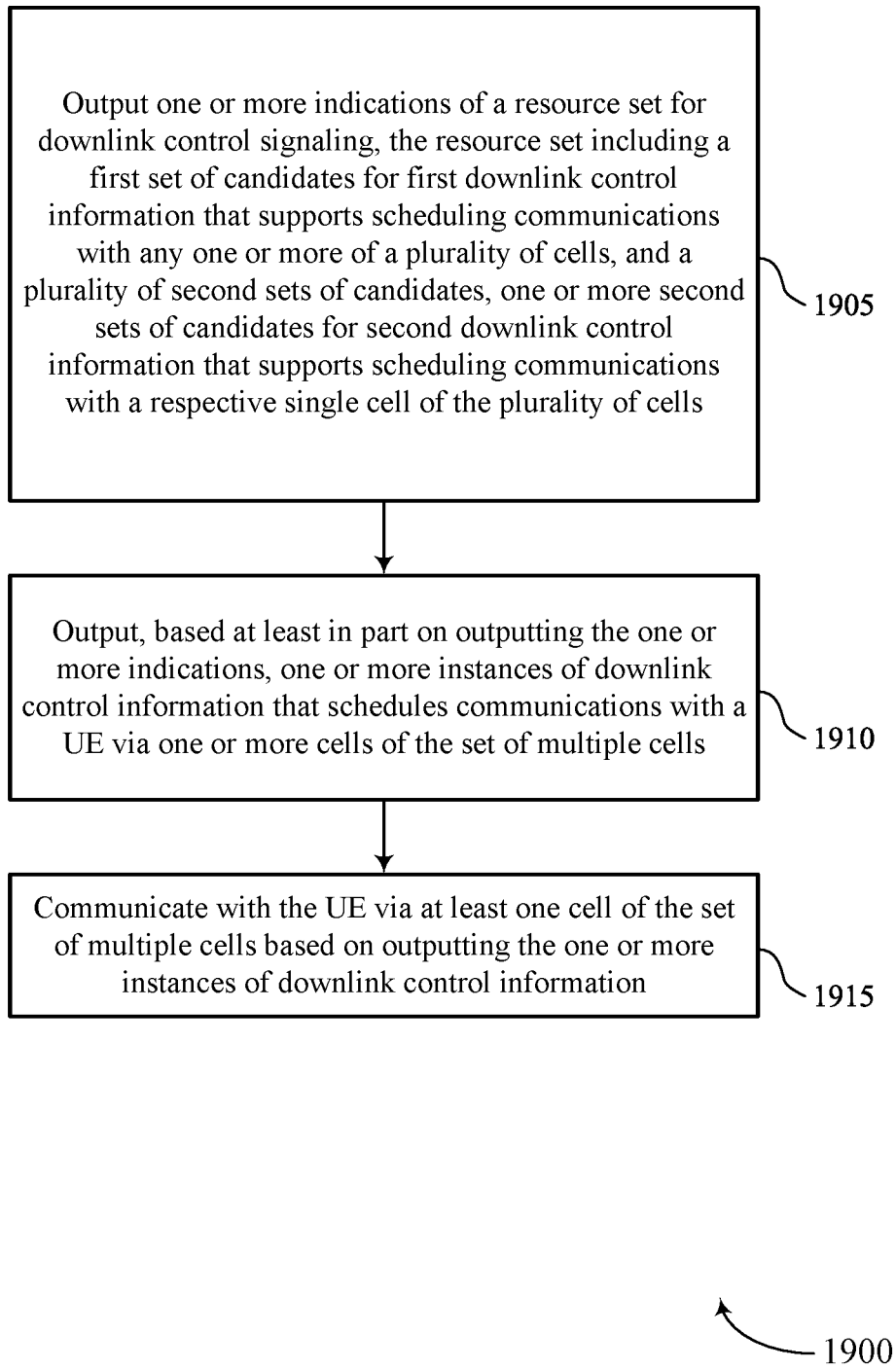

FIG. 19 illustrates a flowchart showing a method 1900 that supports techniques for processing DCI for scheduling multiple cells in accordance with one or more aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include outputting one or more indications of a resource set for downlink control signaling, the resource set including a first set of candidates for first DCI that supports scheduling communications with any one or more of a plurality of cells, and a plurality of second sets of candidates, one or more second sets of candidates for second DCI that supports scheduling communications with a respective single cell of the plurality of cells. The operations of 1905 may be performed in accordance with examples as disclosed herein. In some examples, aspects of the operations of 1905 may be performed by a resource set indication component 1525 as described with reference to FIG. 15.

At 1910, the method may include outputting, based on outputting the one or more indications, one or more instances of DCI that schedules communications with a UE via one or more cells of the set of multiple cells. The operations of 1910 may be performed in accordance with examples as disclosed herein. In some examples, aspects of the operations of 1910 may be performed by a DCI component 1530 as described with reference to FIG. 15.

At 1915, the method may include communicating with the UE via at least one cell of the set of multiple cells based on outputting the one or more instances of DCI. The operations of 1915 may be performed in accordance with examples as disclosed herein. In some examples, aspects of the operations of 1915 may be performed by a communication component 1535 as described with reference to FIG. 15.

Figure 20:
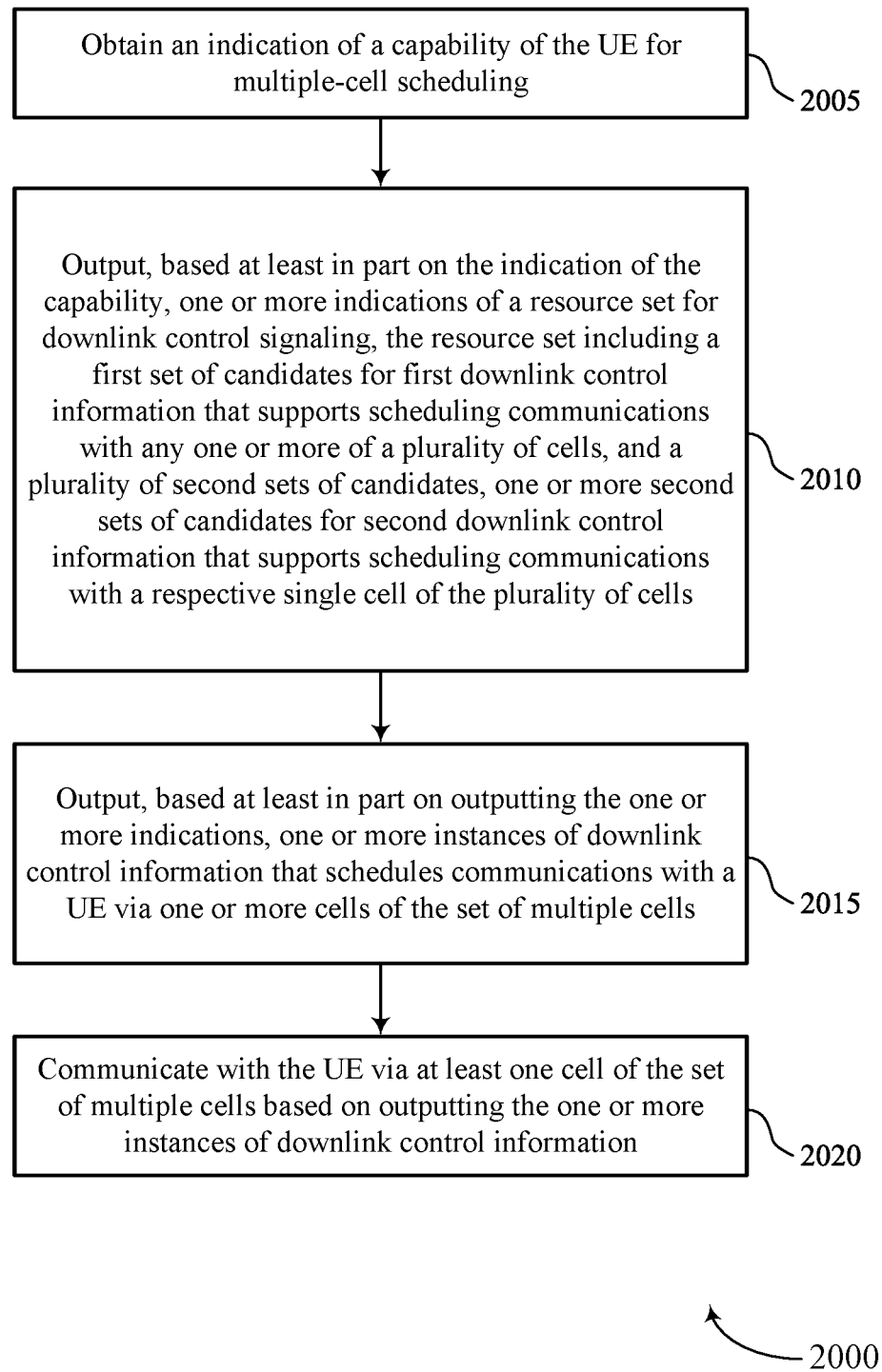

FIG. 20 illustrates a flowchart showing a method 2000 that supports techniques for processing DCI for scheduling multiple cells in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include obtaining an indication of a capability of the UE for multiple-cell scheduling. The operations of 2005 may be performed in accordance with examples as disclosed herein. In some examples, aspects of the operations of 2005 may be performed by a capability reception component 1540 as described with reference to FIG. 15.

At 2010, the method may include outputting, based at least in part on the indication of the capability, one or more indications of a resource set for downlink control signaling, the resource set including a first set of candidates for first DCI that supports scheduling communications with any one or more of a plurality of cells, and a plurality of second sets of candidates, one or more second sets of candidates for second DCI that supports scheduling communications with a respective single cell of the plurality of cells. The operations of 2010 may be performed in accordance with examples as disclosed herein. In some examples, aspects of the operations of 2010 may be performed by a resource set indication component 1525 as described with reference to FIG. 15.

At 2015, the method may include outputting, based on outputting the one or more indications, one or more instances of DCI that schedules communications with a UE via one or more cells of the set of multiple cells. The operations of 2015 may be performed in accordance with examples as disclosed herein. In some examples, aspects of the operations of 2015 may be performed by a DCI component 1530 as described with reference to FIG. 15.

At 2020, the method may include communicating with the UE via at least one cell of the set of multiple cells based on outputting the one or more instances of DCI. The operations of 2020 may be performed in accordance with examples as disclosed herein. In some examples, aspects of the operations of 2020 may be performed by a communication component 1535 as described with reference to FIG. 15.

The following provides an overview of aspects of the present disclosure:

Aspect 1: A method for wireless communication at a UE, the method comprising: receiving one or more indications of a resource set for downlink control signaling, the resource set comprising: a first set of candidates for first DCI that supports scheduling communications with any one or more of a plurality of cells, and a plurality of second sets of candidates, one or more second sets of candidates for second DCI that supports scheduling communications with a respective single cell of the plurality of cells; and monitoring the resource set for DCI that schedules communications via one or more cells of the plurality of cells based at least in part on the one or more indications.

Aspect 2: The method of aspect 1, further comprising: receiving one or more instances of DCI based at least in part on the monitoring; and communicating via at least one cell of the plurality of cells based at least in part on the received one or more instances of DCI.

Aspect 3: The method of any of aspects 1 through 2, wherein the monitoring comprises: monitoring for one or more first DCI formats in the first set of candidates, or monitoring for one or more second DCI formats in one or more second sets of candidates, or a combination thereof.

Aspect 4: The method of any of aspects 1 through 3, wherein the monitoring comprises: monitoring the resource set in accordance with a configured first quantity of instances of a first format of the first DCI in the first set of candidates during a slot of a scheduling cell, or a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

Aspect 5: The method of aspect 4, wherein the monitoring comprises: refraining from monitoring at least a portion of the plurality of second sets of candidates during the slot of the scheduling cell based at least in part on receiving an instance of the first format of the first DCI during the slot of a scheduling cell; or refraining from monitoring at least a portion of the first set of candidates during the slot of the scheduling cell based at least in part on receiving an instance of the second format of the second DCI during the slot of a scheduling cell.

Aspect 6: The method of any of aspects 1 through 5, wherein the monitoring comprises: monitoring the resource set in accordance with each cell of the plurality of cells being operable for scheduling with a configured first quantity of instances of a first format of the first DCI in the first set of candidates during a slot of a scheduling cell, or a with a configured second quantity of instances of a second format of the second DCI in each second set of candidates during a slot of a scheduling cell, but not both the configured first quantity of instances of the first format of the first DCI and the configured second quantity of instances of the second format of the second DCI during the slot of the scheduling cell.

Aspect 7: The method of aspect 6, wherein the monitoring comprises: refraining from monitoring at least a portion of the plurality of second sets of candidates, corresponding to one or more of the plurality of cells, during the slot of the scheduling cell based at least in part on receiving an instance of the first format of the first downlink information during the slot of a scheduling cell associated with scheduling communications of the one or more of the plurality of cells.

Aspect 8: The method of any of aspects 1 through 7, wherein the monitoring comprises: monitoring the resource set in accordance with a configured first quantity of instances of a first format of the first DCI in the first set of candidates during a slot of a scheduling cell, and a configured second quantity of instances of a second format of the second DCI in each second set of candidates during a slot of a scheduling cell.

Aspect 9: The method of any of aspects 1 through 8, further comprising: transmitting an indication of a capability for multiple-cell scheduling, wherein receiving at least one of the one or more indications of the resource set for downlink control signaling is based at least in part on transmitting the indication of the capability for multiple-cell scheduling.

Aspect 10: The method of any of aspects 1 through 9, wherein receiving the one or more indications of the resource set comprises: receiving an indication that associates the first set of candidates with a pool of downlink control resources of one of the cells of the plurality of cells.

Aspect 11: The method of any of aspects 1 through 10, wherein receiving the one or more indications of the resource set comprises: receiving a respective indication of at least one second set of candidates via the respective cell.

Aspect 12: The method of any of aspects 1 through 11, wherein receiving the one or more indications of the resource set comprises: receiving at least one indication of the resource set via a cell not included in the plurality of cells.

Aspect 13: The method of any of aspects 1 through 12, wherein receiving the one or more indications of the resource set comprises: receiving at least one indication of the resource set via RRC signaling.

Aspect 14: The method of any of aspects 1 through 13, wherein the first set of candidates is associated with a first set of CCEs during a slot of a scheduling cell; and one or more second sets of candidates is associated with a respective second set of CCEs during the slot of the scheduling cell.

Aspect 15: The method of any of aspects 1 through 14, wherein the monitoring comprises: monitoring the resource set for DCI that schedules uplink communications, or schedules downlink communications, or schedules a combination of uplink communications and downlink communications based at least in part on the one or more indications.

Aspect 16: A method for wireless communication at a network entity, the method comprising: outputting one or more indications of a resource set for downlink control signaling, the resource set comprising: a first set of candidates for first DCI that supports scheduling communications with any one or more of a plurality of cells, and a plurality of second sets of candidates, one or more second sets of candidates for second DCI that supports scheduling communications with a respective single cell of the plurality of cells; outputting, based at least in part on outputting the one or more indications, one or more instances of DCI that schedules communications with a UE via one or more cells of the plurality of cells; and communicating with the UE via at least one cell of the plurality of cells based at least in part on outputting the one or more instances of DCI.

Aspect 17: The method of aspect 16, wherein outputting the one or more instances of DCI comprises: outputting one or more first DCI formats in the first set of candidates, or outputting one or more second DCI formats in one or more second sets of candidates, or a combination thereof.

Aspect 18: The method of any of aspects 16 through 17, wherein outputting the one or more instances of DCI comprises: outputting one or more instances of a first format of the first DCI in the first set of candidates during a slot of a scheduling cell, or one or more instances of a second format of the second DCI in one or more second sets of candidates during the slot of the scheduling cell, but not an instance of the first format of the first DCI in the first set of candidates and an instance of the second format of the second DCI in any of the second sets of candidates during the slot of the scheduling cell.

Aspect 19: The method of any of aspects 16 through 18, wherein outputting the one or more instances of DCI comprises: outputting one or more instances of a first format of the first DCI in the first set of candidates during a slot of a scheduling cell to schedule communications via a cell of the plurality of cells, or one or more instances of a second format of the second DCI in the second set of candidates corresponding to the cell during the slot of a scheduling cell to schedule communications via the cell, but not an instance of the first format of the first DCI in the first set of candidates and an instance of the second format of the second DCI the second set of candidates during the slot of the scheduling cell to schedule communications via the cell.

Aspect 20: The method of any of aspects 16 through 19, wherein outputting the one or more instances of DCI comprises: outputting one or more instances of a first format of the first DCI in the first set of candidates during a slot of a scheduling cell, and one or more instances of a second format of the second DCI in one or more second sets of candidates during the slot of the scheduling cell.

Aspect 21: The method of any of aspects 16 through 20, further comprising: obtaining an indication of a capability of the UE for multiple-cell scheduling, wherein outputting at least one of the one or more indications of the resource set for downlink control signaling is based at least in part on obtaining the indication of the capability for multiple-cell scheduling.

Aspect 22: The method of any of aspects 16 through 21, wherein outputting the one or more indications of the resource set comprises: outputting an indication that associates the first set of candidates with a pool of downlink control resources of one of the cells of the plurality of cells.

Aspect 23: The method of any of aspects 16 through 22, wherein outputting the one or more indications of the resource set comprises: outputting a respective indication of at least one second set of candidates via the respective cell.

Aspect 24: The method of any of aspects 16 through 23, wherein outputting the one or more indications of the resource set comprises: outputting at least one indication of the resource set via a cell not included in the plurality of cells.

Aspect 25: The method of any of aspects 16 through 24, wherein outputting the one or more indications of the resource set comprises: outputting at least one indication of the resource set via RRC signaling.

Aspect 26: The method of any of aspects 16 through 25, wherein the first set of candidates is associated with a first set of CCEs during a slot of a scheduling cell; and one or more second sets of candidates is associated with a respective second set of CCEs during the slot of the scheduling cell.

Aspect 27: The method of any of aspects 16 through 26, wherein outputting the one or more instances of DCI comprises: outputting at least one instance of DCI that schedules uplink communications, or that schedules downlink communications, or that schedules a combination of uplink communications and downlink communications.

Aspect 28: An apparatus for wireless communication at a UE, comprising a processor; memory coupled with the processor; and instructions stored in the memory and executable by the processor to cause the apparatus to perform a method of any of aspects 1 through 15.

Aspect 29: An apparatus for wireless communication at a UE, comprising at least one means for performing a method of any of aspects 1 through 15.

Aspect 30: A non-transitory computer-readable medium storing code for wireless communication at a UE, the code comprising instructions executable by a processor to perform a method of any of aspects 1 through 15.

Aspect 31: An apparatus for wireless communication at a network entity, comprising a processor; memory coupled with the processor; and instructions stored in the memory and executable by the processor to cause the apparatus to perform a method of any of aspects 16 through 27.

Aspect 32: An apparatus for wireless communication at a network entity, comprising at least one means for performing a method of any of aspects 16 through 27.

Aspect 33: A non-transitory computer-readable medium storing code for wireless communication at a network entity, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
one or more processors; and
one or more memories coupled with the one or more processors and storing instructions executable by the one or more processors to cause the apparatus to:
receive one or more indications of a resource set for downlink control signaling, the resource set comprising:
a first set of candidates for first downlink control information configured for scheduling communications with any of a plurality of cells, and
a plurality of second sets of candidates, one or more of the plurality of second sets of candidates for second downlink control information configured for scheduling communications with a respective single cell of the plurality of cells; and
monitor the resource set for downlink control information that schedules communications via one or more cells of the plurality of cells based at least in part on the one or more indications.

2. The apparatus of claim 1, wherein the instructions are further executable by the one or more processors to cause the apparatus to:
receive one or more instances of downlink control information based at least in part on the monitoring; and
communicate via at least one cell of the plurality of cells based at least in part on the received one or more instances of downlink control information.

3. The apparatus of claim 1, wherein the instructions to monitor the resource set are executable by the one or more processors to cause the apparatus to:
monitor for one or more first downlink control information formats in the first set of candidates, or monitoring for one or more second downlink control information formats in one or more second sets of candidates, or a combination thereof.

4. The apparatus of claim 1, wherein the instructions to monitor the resource set are executable by the one or more processors to cause the apparatus to:
monitor the resource set in accordance with a configured first quantity of instances of a first format of the first downlink control information in the first set of candidates during a slot of a scheduling cell, or a configured second quantity of instances of a second format of the second downlink control information in each second set of candidates during a slot of a scheduling cell, but not both the configured first quantity of instances of the first format of the first downlink control information and the configured second quantity of instances of the second format of the second downlink control information during the slot of the scheduling cell.

5. The apparatus of claim 4, wherein the instructions to monitor the resource set are executable by the one or more processors to cause the apparatus to:
refrain from monitoring at least a portion of the plurality of second sets of candidates during the slot of the scheduling cell based at least in part on receiving an instance of the first format of the first downlink control information during the slot of a scheduling cell; or
refrain from monitoring at least a portion of the first set of candidates during the slot of the scheduling cell based at least in part on receiving an instance of the second format of the second downlink control information during the slot of a scheduling cell.

6. The apparatus of claim 1, wherein the instructions to monitor the resource set are executable by the one or more processors to cause the apparatus to:
monitor the resource set in accordance with each cell of the plurality of cells being operable for scheduling with a configured first quantity of instances of a first format of the first downlink control information in the first set of candidates during a slot of a scheduling cell, or a with a configured second quantity of instances of a second format of the second downlink control information in each second set of candidates during a slot of a scheduling cell, but not both the configured first quantity of instances of the first format of the first downlink control information and the configured second quantity of instances of the second format of the second downlink control information during the slot of the scheduling cell.

7. The apparatus of claim 6, wherein the instructions to monitor the resource set are executable by the one or more processors to cause the apparatus to:
refrain from monitoring at least a portion of the plurality of second sets of candidates, corresponding to one or more of the plurality of cells, during the slot of the scheduling cell based at least in part on receiving an instance of the first format of the first downlink control information during the slot of a scheduling cell associated with scheduling communications of the one or more of the plurality of cells.

8. The apparatus of claim 1, wherein the instructions to monitor the resource set are executable by the one or more processors to cause the apparatus to:
monitor the resource set in accordance with a configured first quantity of instances of a first format of the first downlink control information in the first set of candidates during a slot of a scheduling cell, and a configured second quantity of instances of a second format of the second downlink control information in each second set of candidates during a slot of a scheduling cell.

9. The apparatus of claim 1, wherein the instructions are further executable by the one or more processors to cause the apparatus to:
transmit an indication of a capability for multiple-cell scheduling, wherein receiving at least one of the one or more indications of the resource set for downlink control signaling is based at least in part on transmitting the indication of the capability for multiple-cell scheduling.

10. The apparatus of claim 1, wherein the instructions to receive the one or more indications of the resource set are executable by the one or more processors to cause the apparatus to:

receive an indication that associates the first set of candidates with a pool of downlink control resources of one of the cells of the plurality of cells.

11. The apparatus of claim 1, wherein the instructions to receive the one or more indications of the resource set are executable by the one or more processors to cause the apparatus to:
receive a respective indication of at least one second set of candidates via the respective cell.

12. The apparatus of claim 1, wherein the instructions to receive the one or more indications of the resource set are executable by the one or more processors to cause the apparatus to:
receive at least one indication of the resource set via a cell not included in the plurality of cells.

13. The apparatus of claim 1, wherein the instructions to receive the one or more indications of the resource set are executable by the one or more processors to cause the apparatus to:
receive at least one indication of the resource set via radio resource control (RRC) signaling.

14. The apparatus of claim 1, wherein:
the first set of candidates is associated with a first set of control channel elements during a slot of a scheduling cell; and
one or more second sets of candidates is associated with a respective second set of control channel elements during the slot of the scheduling cell.

15. The apparatus of claim 1, wherein the instructions to monitor the resource set are executable by the one or more processors to cause the apparatus to:
monitor the resource set for downlink control information that schedules uplink communications, or schedules downlink communications, or schedules a combination of uplink communications and downlink communications based at least in part on the one or more indications.

16. An apparatus for wireless communication, comprising:
one or more processors; and
one or more memories coupled with the one or more processors and storing instructions executable by the processor one or more processors to cause the apparatus to:
output one or more indications of a resource set for downlink control signaling, the resource set comprising:
a first set of candidates for first downlink control information configured for scheduling communications with any of a plurality of cells, and
a plurality of second sets of candidates, one or more of the plurality of second sets of candidates for second downlink control information configured for scheduling communications with a respective single cell of the plurality of cells;
output, based at least in part on outputting the one or more indications, one or more instances of downlink control information that schedules communications with a UE via one or more cells of the plurality of cells; and
communicate with the UE via at least one cell of the plurality of cells based at least in part on outputting the one or more instances of downlink control information.

17. The apparatus of claim 16, wherein the instructions to output the one or more instances of downlink control information are executable by the one or more processors to cause the apparatus to:
output one or more first downlink control information formats in the first set of candidates, or outputting one or more second downlink control information formats in one or more second sets of candidates, or a combination thereof.

18. The apparatus of claim 16, wherein the instructions to output the one or more instances of downlink control information are executable by the one or more processors to cause the apparatus to:
output one or more instances of a first format of the first downlink control information in the first set of candidates during a slot of a scheduling cell, or one or more instances of a second format of the second downlink control information in one or more second sets of candidates during the slot of the scheduling cell, but not an instance of the first format of the first downlink control information in the first set of candidates and an instance of the second format of the second downlink control information in any of the second sets of candidates during the slot of the scheduling cell.

19. The apparatus of claim 16, wherein the instructions to output the one or more instances of downlink control information are executable by the one or more processors to cause the apparatus to:
output one or more instances of a first format of the first downlink control information in the first set of candidates during a slot of a scheduling cell to schedule communications via a cell of the plurality of cells, or one or more instances of a second format of the second downlink control information in the second set of candidates corresponding to the cell during the slot of a scheduling cell to schedule communications via the cell, but not an instance of the first format of the first downlink control information in the first set of candidates and an instance of the second format of the second downlink control information the second set of candidates during the slot of the scheduling cell to schedule communications via the cell.

20. The apparatus of claim 16, wherein the instructions to output the one or more instances of downlink control information are executable by the one or more processors to cause the apparatus to:
output one or more instances of a first format of the first downlink control information in the first set of candidates during a slot of a scheduling cell, and one or more instances of a second format of the second downlink control information in one or more second sets of candidates during the slot of the scheduling cell.

21. The apparatus of claim 16, wherein the instructions are further executable by the one or more processors to cause the apparatus to:
obtain an indication of a capability of the UE for multiple-cell scheduling, wherein outputting at least one of the one or more indications of the resource set for downlink control signaling is based at least in part on obtaining the indication of the capability for multiple-cell scheduling.

22. The apparatus of claim 16, wherein the instructions to output the one or more indications of the resource set are executable by the one or more processors to cause the apparatus to:

output an indication that associates the first set of candidates with a pool of downlink control resources of one of the cells of the plurality of cells.

23. The apparatus of claim 16, wherein the instructions to output the one or more indications of the resource set are executable by the one or more processors to cause the apparatus to:
output a respective indication of at least one second set of candidates via the respective cell.

24. The apparatus of claim 16, wherein the instructions to output the one or more indications of the resource set are executable by the one or more processors to cause the apparatus to:
output at least one indication of the resource set via a cell not included in the plurality of cells.

25. The apparatus of claim 16, wherein the instructions to output the one or more indications of the resource set are executable by the one or more processors to cause the apparatus to:
output at least one indication of the resource set via radio resource control (RRC) signaling.

26. The apparatus of claim 16, wherein:
the first set of candidates is associated with a first set of control channel elements during a slot of a scheduling cell; and
one or more second sets of candidates is associated with a respective second set of control channel elements during the slot of the scheduling cell.

27. The apparatus of claim 16, wherein the instructions to output the one or more instances of downlink control information are executable by the one or more processors to cause the apparatus to:
output at least one instance of downlink control information that schedules uplink communications, or that schedules downlink communications, or that schedules a combination of uplink communications and downlink communications.

28. A method for wireless communication at a user equipment (UE), the method comprising:
receiving one or more indications of a resource set for downlink control signaling, the resource set comprising:
a first set of candidates for first downlink control information configured for scheduling communications with any of a plurality of cells, and
a plurality of second sets of candidates, one or more of the plurality of second sets of candidates for second downlink control information configured for scheduling communications with a respective single cell of the plurality of cells; and
monitoring the resource set for downlink control information that schedules communications via one or more cells of the plurality of cells based at least in part on the one or more indications.

29. The method of claim 28, further comprising:
receiving one or more instances of downlink control information based at least in part on the monitoring; and
communicating via at least one cell of the plurality of cells based at least in part on the received one or more instances of downlink control information.

30. A method for wireless communication at a network entity, the method comprising:
outputting one or more indications of a resource set for downlink control signaling, the resource set comprising:
a first set of candidates for first downlink control information configured for scheduling communications with any of a plurality of cells, and
a plurality of second sets of candidates, one or more of the plurality of second sets of candidates for second downlink control information configured for scheduling communications with a respective single cell of the plurality of cells;
outputting, based at least in part on outputting the one or more indications, one or more instances of downlink control information that schedules communications with a UE via one or more cells of the plurality of cells; and
communicating with the UE via at least one cell of the plurality of cells based at least in part on outputting the one or more instances of downlink control information.

* * * * *